(12) United States Patent
Shibao

(10) Patent No.: US 11,261,564 B2
(45) Date of Patent: Mar. 1, 2022

(54) WIRE ROPE WITH RESIN WIRE, RESIN WIRE WINDING DIE, AND METHOD FOR PRODUCING WIRE ROPE WITH RESIN WIRE

(71) Applicant: Riken Kogyo Inc., Hokkaido (JP)

(72) Inventor: Yukihiro Shibao, Hokkaido (JP)

(73) Assignee: Riken Kogyo Inc.

( * ) Notice: Subject to any disclaimer, the term of this patent is extended or adjusted under 35 U.S.C. 154(b) by 0 days.

(21) Appl. No.: 16/619,952

(22) PCT Filed: Dec. 26, 2017

(86) PCT No.: PCT/JP2017/046767
§ 371 (c)(1),
(2) Date: Dec. 6, 2019

(87) PCT Pub. No.: WO2019/130443
PCT Pub. Date: Jul. 4, 2019

(65) Prior Publication Data
US 2021/0131030 A1    May 6, 2021

(51) Int. Cl.
| | | |
|---|---|---|
| *D07B 1/14* | (2006.01) | |
| *D07B 1/06* | (2006.01) | |
| *D07B 1/16* | (2006.01) | |
| *D07B 7/02* | (2006.01) | |
| *E01F 15/06* | (2006.01) | |

(52) U.S. Cl.
CPC .............. *D07B 1/147* (2013.01); *D07B 1/068* (2013.01); *D07B 1/148* (2013.01); *D07B 1/16* (2013.01); *D07B 7/02* (2013.01); *D07B 2205/3067* (2013.01); *E01F 15/06* (2013.01)

(58) Field of Classification Search
CPC ............ D07B 1/068; D07B 1/148; D07B 1/16
See application file for complete search history.

(56) References Cited

U.S. PATENT DOCUMENTS

| | | | | |
|---|---|---|---|---|
| 2,097,644 | A * | 11/1937 | Riddle ..................... | D07B 7/02 57/138 |
| 3,299,686 | A * | 1/1967 | Lemieux ................. | B21C 25/02 72/261 |
| 4,422,208 | A | 12/1983 | Rohrbaugh | |
| 6,207,939 | B1 | 3/2001 | Allaire et al. | |

(Continued)

FOREIGN PATENT DOCUMENTS

| | | |
|---|---|---|
| AT | 005699 U1 | 10/2002 |
| CN | 102713053 A | 10/2012 |

(Continued)

*Primary Examiner* — Shaun R Hurley
(74) *Attorney, Agent, or Firm* — Price Heneveld LLP

(57) ABSTRACT

Provided is a wire rope with resin wire, including a wire rope body in which a plurality of strands are twisted together, and at least one resin wire spirally wound around the wire rope body along a recess between the strands. Strand grooves into which the strands can fit and a resin wire groove into which the resin wire can fit are formed spirally along the twist of the wire rope with resin wire, in a winding hole of a resin wire winding die used for winding the resin wire around the wire rope body. As a result, the resin wire can be easily and reliably mounted on the wire rope body and a wire rope with resin wire can be thus produced.

4 Claims, 31 Drawing Sheets

(56) References Cited

U.S. PATENT DOCUMENTS

| | | | | |
|---|---|---|---|---|
| 6,500,365 B1* | 12/2002 | Cecchi | ................... | B29C 48/06 |
| | | | | 264/1.28 |
| 2004/0006963 A1* | 1/2004 | Misrachi | ................ | D07B 1/167 |
| | | | | 57/223 |
| 2009/0114422 A1 | 5/2009 | Longatti | | |
| 2013/0318937 A1* | 12/2013 | Takeuchi | ............... | D07B 5/007 |
| | | | | 57/220 |
| 2014/0291886 A1* | 10/2014 | Mark | ................... | B29C 64/209 |
| | | | | 264/163 |

FOREIGN PATENT DOCUMENTS

| | | |
|---|---|---|
| CN | 104179886 A | 12/2014 |
| CN | 204224908 U | 3/2015 |
| CN | 104968857 A | 10/2015 |
| CN | 105297507 A | 2/2016 |
| CN | 105735019 A | 7/2016 |
| DE | 1046134 | 12/1958 |
| JP | 5460922 U | 10/1977 |
| JP | 54-41049 Y2 | 12/1979 |
| JP | 7-71012 A | 3/1995 |
| JP | 7-138923 A | 5/1995 |
| JP | 2012193475 A | 10/2012 |

* cited by examiner

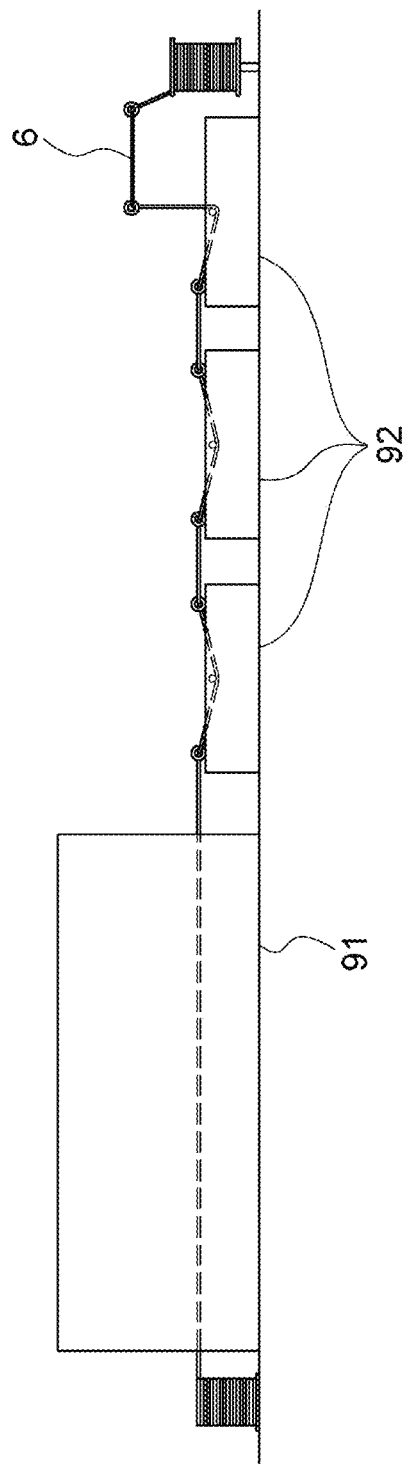

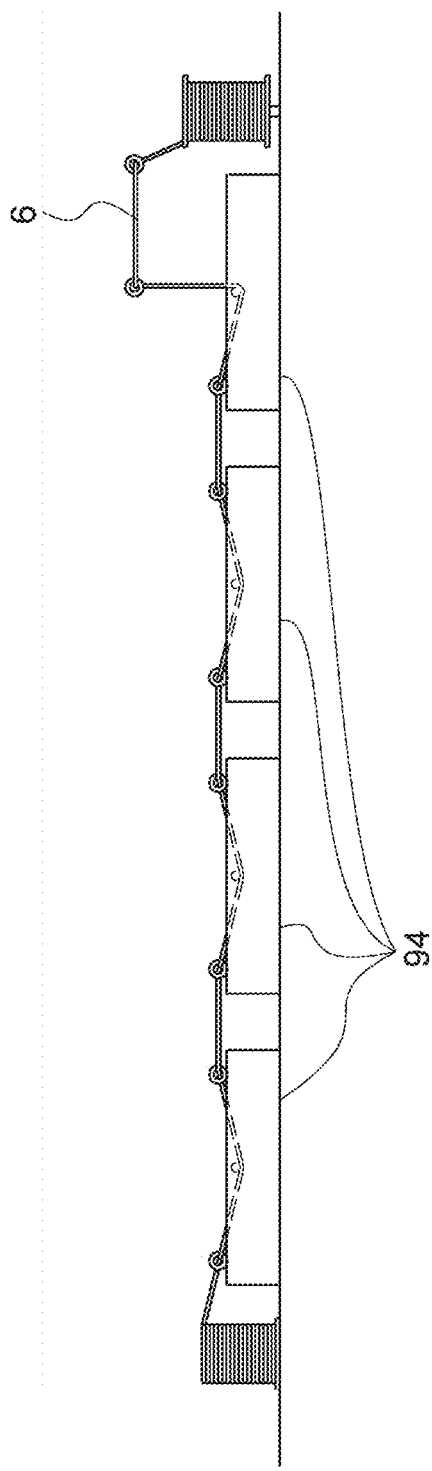

WIRE ROPE WITH RESIN WIRE, RESIN WIRE WINDING DIE, AND METHOD FOR PRODUCING WIRE ROPE WITH RESIN WIRE

TECHNICAL FIELD

The present invention relates to a wire rope with resin wire, a resin wire winding die, and a method for producing a wire rope with resin wire.

BACKGROUND ART

Vertical lines in provisional two-lane sections in expressways are ordinarily delimited by rubber poles. However, delimiting two-lane sections with rubber poles alone may result in elderly drivers driving in the opposite lane, or in vehicles jumping onto the opposite lane in a collision accident. In order to increase safety, therefore, various methods for delimiting two lanes in roads using guard cables have been adopted in recent years.

In order to increase visibility, moreover, the wires of wire ropes used in the guard cables may in some instances be coated with a resin having a phosphorescent agent mixed thereinto, as disclosed in PTL 1, to assist the vision of drivers also under poor visibility conditions, such as during nighttime.

CITATION LIST

Patent Literature

[PTL 1] Japanese Patent Application Publication No. 2002-155480

SUMMARY OF INVENTION

Technical Problem

However, coating of wires one by one with a resin, as in PTL 1 requires an elaborate process of extruding iron wires and a resin. Methods are therefore sought in which resin wires, such as phosphorescent iron wires, are mounted on a wire rope body in accordance with a simple method, without resorting to elaborate processes or large equipment. Demand has likewise arisen for wire ropes with attached resin wire around which resin wires are wound in a simple manner, without replacement of wire ropes provided for instance on existing guard cable.

In order to attain the above goal, it is an object of the present invention to provide a wire rope with resin wire, a resin wire winding die, and a method for producing a wire rope with resin wire, that allow mounting resin wires on a wire rope body, reliably and in a simple manner.

Solution to Problem

In order to solve the above problem, the wire rope with resin wire according to the present invention has a wire rope body in which a plurality of strands is twisted together, and at least one resin wire spirally wound around the wire rope body along a recess between the strands.

The resin wire of the wire rope with resin wire according to the present invention may be formed by a resin that contains a phosphorescent agent.

The resin wire may have a core material made up of a copper wire or nichrome wire, and the core material may be covered with a resin and generate heat by being energized.

In the resin wire winding die according to the present invention, which is used for producing a wire rope with resin wire by winding at least one resin wire spirally around a wire rope body in which a plurality of strands is twisted together, the resin wire being wound along a recess between the strands, a winding hole through which the wire rope body and the resin wire can run is formed, and strand grooves into which the respective strands can fit and a resin wire groove into which the resin wire can fit are formed spirally along the twist of the wire rope with resin wire, on an inner peripheral face of the winding hole.

A method for producing a wire rope with resin wire according to the present invention is a method that involves winding a resin wire around a wire rope body using a resin wire winding die, the method including: causing the wire rope body and the resin wire to move by pulling the wire rope body and the resin wire in an axial direction in a state where the wire rope body and the resin wire run through the winding hole, to thereby spirally wind the resin wire around the wire rope body while the resin wire winding die is rotated.

Further, a method for producing a wire rope with resin wire according to the present invention may involve causing a resin wire winding die to move along a wire rope body while rotating in a state where the wire rope body and a resin wire run through a winding hole, to thereby spirally wind the resin wire around the wire rope body.

Advantageous Effects of Invention

The wire rope with resin wire, the resin wire winding die and the method for producing a wire rope with resin wire according to the present invention allow a resin wire to be mounted on a wire rope body reliably and in a simple manner.

BRIEF DESCRIPTION OF DRAWINGS

FIG. 6A is a schematic diagram illustrating a thermal treatment and washing step of wires, in an ordinary production process of a wire rope body.

FIG. 6C is a schematic diagram illustrating a wire plating step, in an ordinary production process of a wire rope body.

DESCRIPTION OF EMBODIMENTS

<Wire Rope with Resin Wire>

A concrete structure of a wire rope with resin wire 1 will be explained first with reference to FIGS. 1 and 2.

Figure 1:
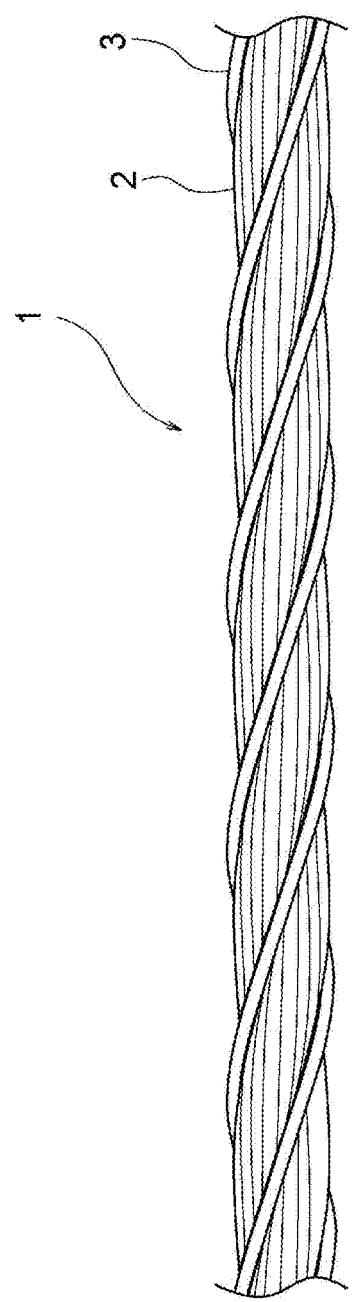
FIG. 1 is a diagram illustrating a wire rope with resin wire according to an embodiment of the present invention.
Figure 2:
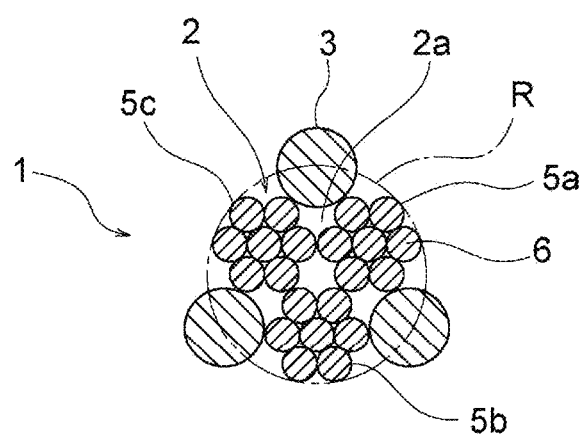
FIG. 2 is a cross-sectional diagram illustrating the shape resulting from cutting the wire rope with resin wire illustrated in FIG. 1 perpendicularly to the extension direction

As illustrated in FIG. 1, a wire rope with resin wire 1 has a wire rope body 2 and three resin wires 3 spirally wound around the wire rope body 2. As illustrated in FIG. 2, the wire rope body 2 results from twisting together three strands 5a, 5b, 5c. Each of the strands 5a, 5b, 5c is formed through twisting together of wires 6. The resin wires 3 are wound around the wire rope body 2 along respective recesses 2a being troughs between the strands 5a, 5b, 5c. The resin wires 3 are provided protruding outward, in the radial direction, beyond a virtual circle R drawn along the contour of the strands 5a, 5b, 5c.

The resin wires 3 are wires formed through extrusion molding of a resin that contains a phosphorescent agent.

The wire rope with resin wire 1 is thus provided with the wire rope body 2 resulting from twisting together of the strands 5a, 5b, 5c, and with the resin wires 3 spirally wound around the wire rope body 2, along the recesses 2a between the strands 5a, 5b, 5c. To produce the wire rope with resin wire 1, therefore, it suffices to wind the resin wires 3 around the finished wire rope body 2, and hence the wire rope with resin wire 1 can be produced in a simpler manner. Moreover, the resin wires 3 can be wound without being affected by heat during the production of the wire rope body 2, and accordingly the resin wires 3 can be mounted on the wire rope body 2 more reliably. The resin wires 3 are wound along the recesses 2a between the strands 5a, 5b, 5c of the wire rope body 2, and in consequence the resin wires 3 can be mounted on the wire rope body 2 more stably. Since the resin wires 3 are wound along the recesses 2a between the strands 5a, 5b, 5c of the wire rope body 2, moreover, the cross-sectional shape of the wire rope with resin wire 1 is close to a round shape, with little unevenness at the surface. Accordingly, when using the wire rope with resin wire 1 in a member equipped with a pulley, for instance in gondolas or ropeways, the wire rope with resin wire 1 does not get caught, and as a result, the movement of the pulley is smooth, with suppressed vibration and noise.

The resin wires 3 are formed out of a resin that contains a phosphorescent agent, and hence emit light in dark places. When the wire rope with resin wire 1 is used as a guard cable in expressways or the like, high visibility can be achieved also under poor visibility conditions such as during the nighttime or in rainy weather.

The resin that forms the resin wires 3 is not limited to a resin that contains a phosphorescent agent. Specifically, the visibility of the wire rope with resin wire 1 can be enhanced, and a gaze guidance effect can be achieved, also in cases where the resin wires 3 are colored for instance in yellow or white.

The resin wires 3 are provided at positions protruding outward, in the radial direction, beyond the strands 5a, 5b, 5c of the wire rope body 2. Therefore, even upon mounting of a metal connection member from outside, for instance onto the ends of the wire rope with resin wire 1, the resin wires 3 become sandwiched in between, thereby bringing about a state in which the connection member and the wire rope body 2 are not in contact; galvanic corrosion is prevented as a result.

In this embodiment, the resin wires 3 are provided protruding outward, in the radial direction, beyond the virtual circle R drawn along the contour of the strands 5a, 5b, 5c, but the embodiment is not limited thereto, and the resin wires 3 may be provided inward of the virtual circle R.

The resin wires 3 are wires formed through extrusion molding of a resin, but are not limited thereto, and may be wires resulting from coating iron wires with a resin. The strength of the wire rope with resin wire 1 can be further increased when the resin wires 3 have iron wires as a core material. The iron wires being the core material of such resin wires 3 are coated with a resin, and accordingly undergo no galvanic corrosion even when wound around a wire rope body 2 made of stainless steel.

The resin wires 3 may be wires in which the surface of a copper wire or nichrome wire that serves as a core material is coated with a resin. In this case, the copper wire or the nichrome wire serving as the core material generates heat when energized, and the resin wires 3 function as heating cables. It becomes therefore possible to prevent accumulation of snow when the wire rope with resin wire 1 is used in snowy areas.

Figure 3A:
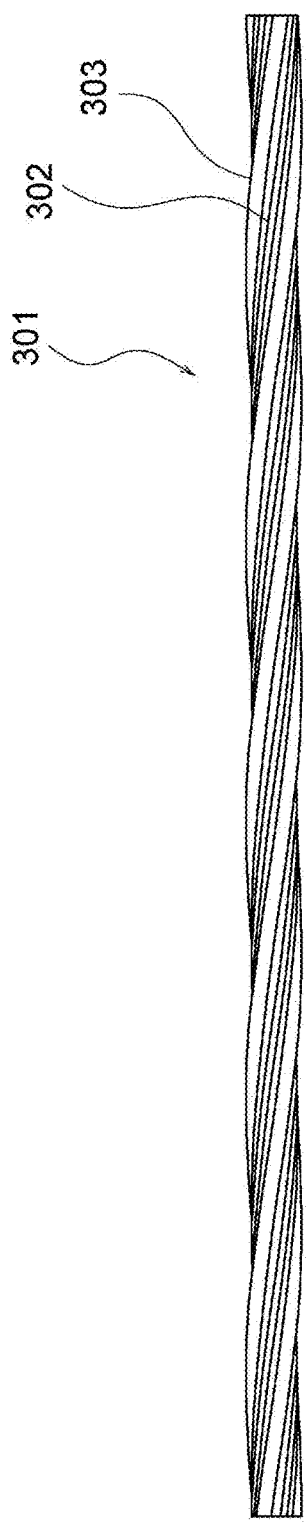
FIG. 3A is a front-view diagram illustrating a wire rope with resin wire according to another embodiment of the present invention.
Figure 3B:
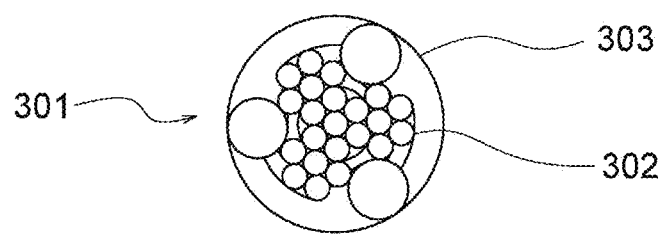
FIG. 3B is a right side-view diagram of the wire rope with resin wire illustrated in FIG. 3A.
Figure 3C:
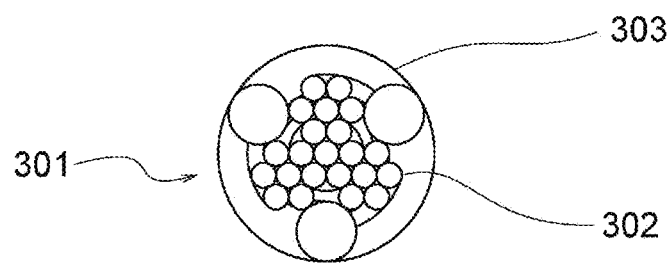
FIG. 3C is a left side-view diagram of the wire rope with resin wire illustrated in FIG. 3A.

The wire rope with resin wire according to the present invention may be a wire rope with resin wire 301 having a wire rope body 302 and resin wires 303 wound around the wire rope body 302, as illustrated in FIGS. 3A to 3C. The dimensions of the wire rope body 302 and of the resin wires 303 of the wire rope with resin wire 301 and the dimensions of the wire rope body 2 and the resin wires 3 of the wire rope with resin wire 1 are different, but the structures are identical. That is, the wire rope body 302 is formed through twisting together of three strands, and the resin wires 303 are spirally wound around the wire rope body 302, along recesses between the strands.

FIG. 3A is a front-view diagram of the wire rope with resin wire 301, with the shape of the wire rope with resin wire 301 being continuous in the left-right direction in FIG. 3A. The shape of the wire rope with resin wire 301 illustrated in FIG. 3A is similarly repeated in the extension direction of the wire rope with resin wire 301, also in a rear-view diagram, a plan-view diagram and a bottom-view diagram of the wire rope with resin wire 301.

<Resin Wire Winding Die>

Figure 4A:
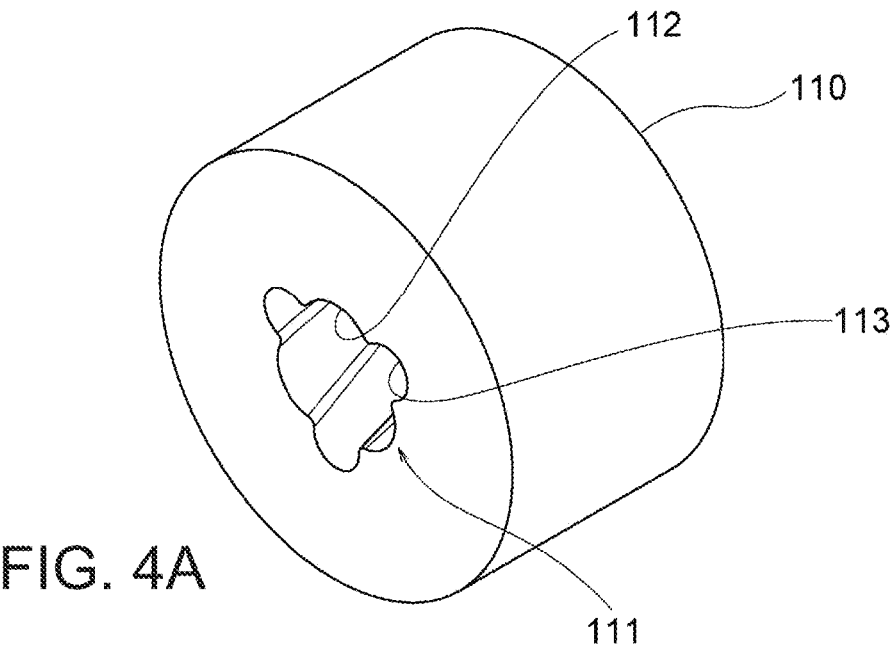
FIG. 4A is a perspective-view diagram illustrating an example of a resin wire winding die used in order to wind resin wires around a wire rope body of the wire rope with resin wire illustrated in FIG. 1.
Figure 4B:
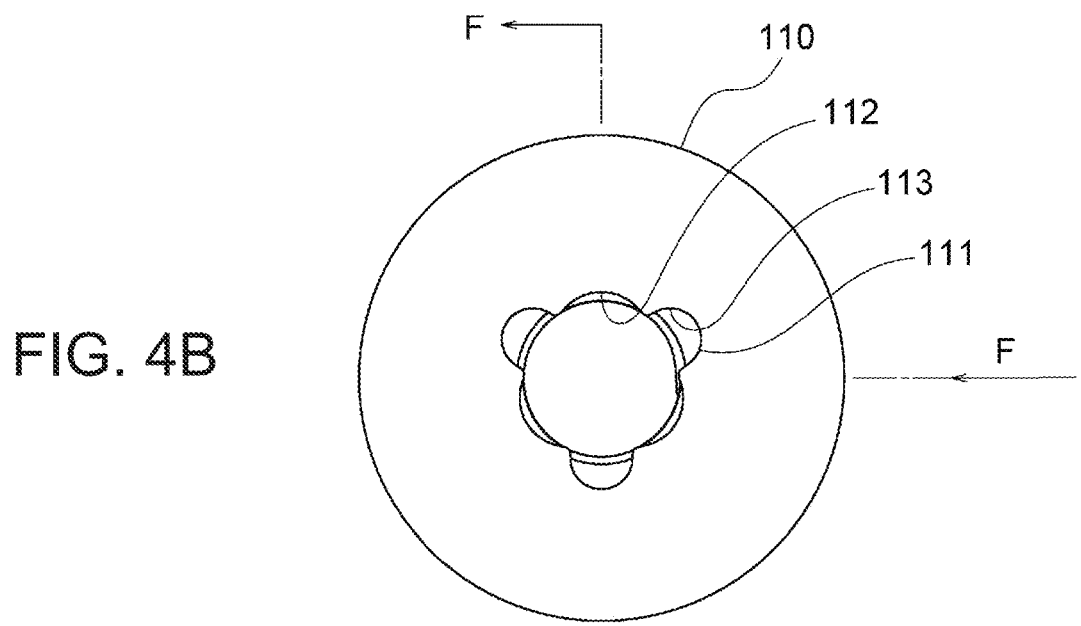
FIG. 4B is a front-view diagram of the resin wire winding die illustrated in FIG. 4A.
Figure 4C:
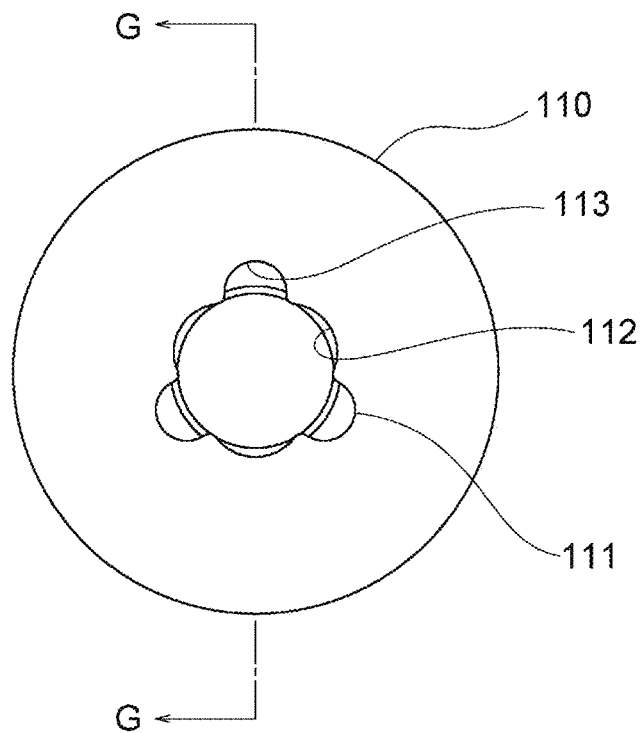
FIG. 4C is a rear-view diagram of the resin wire winding die illustrated in FIG. 4A.
Figure 4D:
FIG. 4D is a plan-view diagram of the resin wire winding die illustrated in FIG. 4A.
Figure 4E:
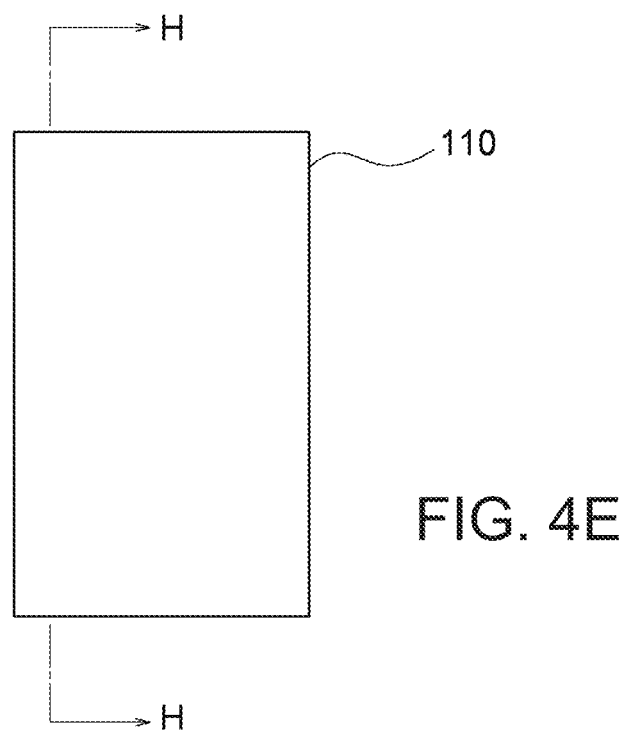
FIG. 4E is a right side-view diagram of the resin wire winding die illustrated in FIG. 4A.

FIGS. 4A to 4H and 5 illustrate a resin wire winding die 110 as an example of the basic shape of a tool for winding resin wires 3 around the wire rope body 2. FIG. 4D is a plan-view diagram of the resin wire winding die 110, but a bottom-view diagram would depict the same shape. FIG. 4E is a right side-view diagram of the resin wire winding die 110, but a left side-view diagram would depict the same shape.

Figure 4F:
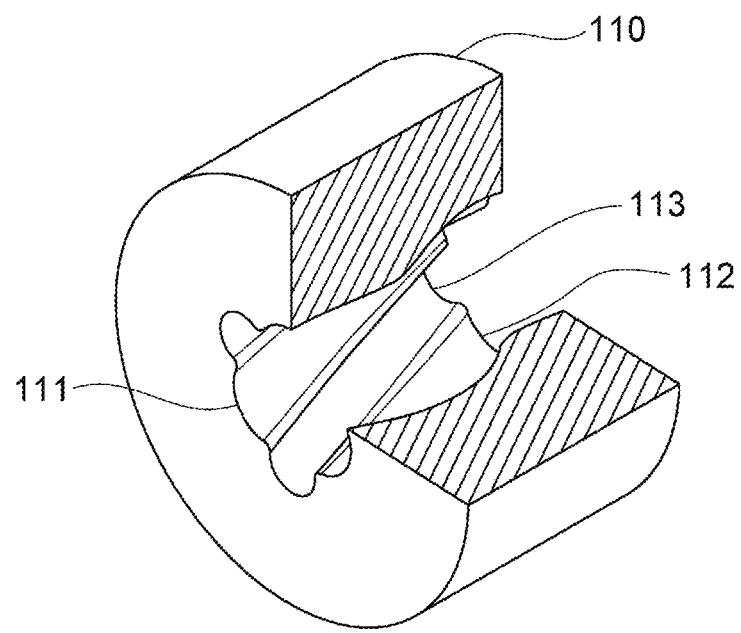
FIG. 4F is a perspective-view diagram illustrating the resin wire winding die depicted in FIG. 4B cut along cutting line F-F.
Figure 4G:
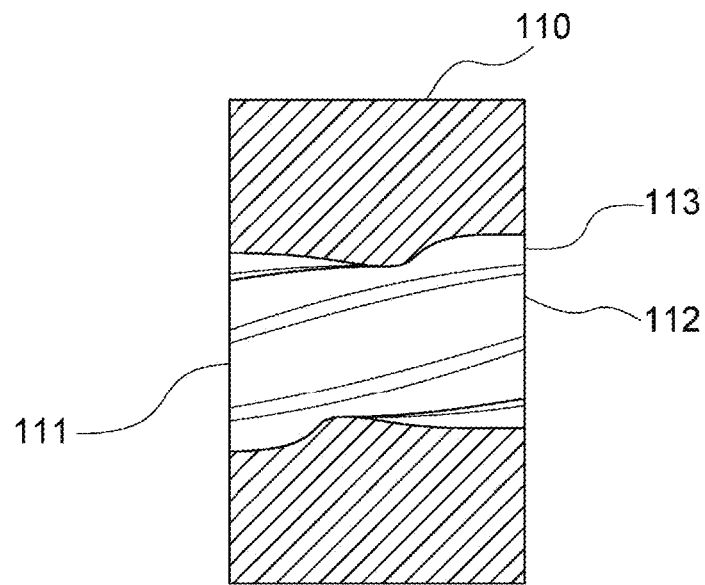
FIG. 4G is a cross-sectional diagram illustrating the resin wire winding die depicted in FIG. 4C cut along cutting line G-G.
Figure 4H:
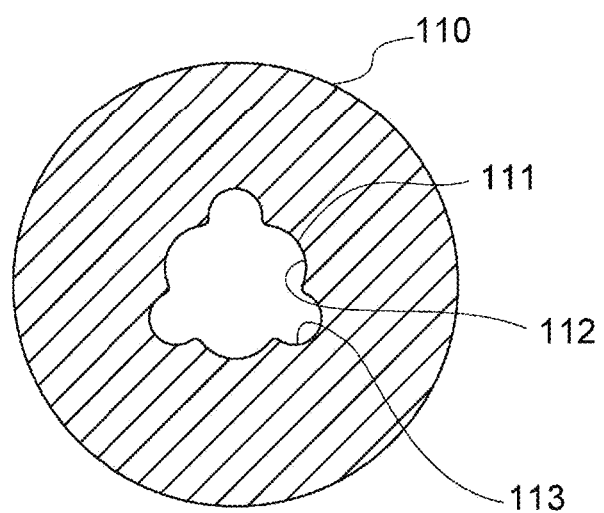
FIG. 4H is a cross-sectional diagram illustrating the resin wire winding die depicted in FIG. 4E cut along cutting line H-H.

As illustrated in FIG. 4A, the resin wire winding die 110 has a substantially cylindrical shape. As illustrated in FIGS. 4B and 4C, a winding hole 111 is formed in the central portion of the resin wire winding die 110. On the inner peripheral face of the winding hole 111 there are formed strand grooves 112 respectively corresponding to the strands 5a, 5b, 5c, and resin wire grooves 113 respectively corresponding to the resin wires 3. That is, the strands 5a, 5b, 5c can fit in the respective strand grooves 112, and the resin wires 3 can fit in the respective resin wire grooves 113. As illustrated in FIGS. 4F and 4G, the strand grooves 112 and the resin wire grooves 113 are formed spirally along the twist of the wire rope with resin wire 1.

Figure 5:
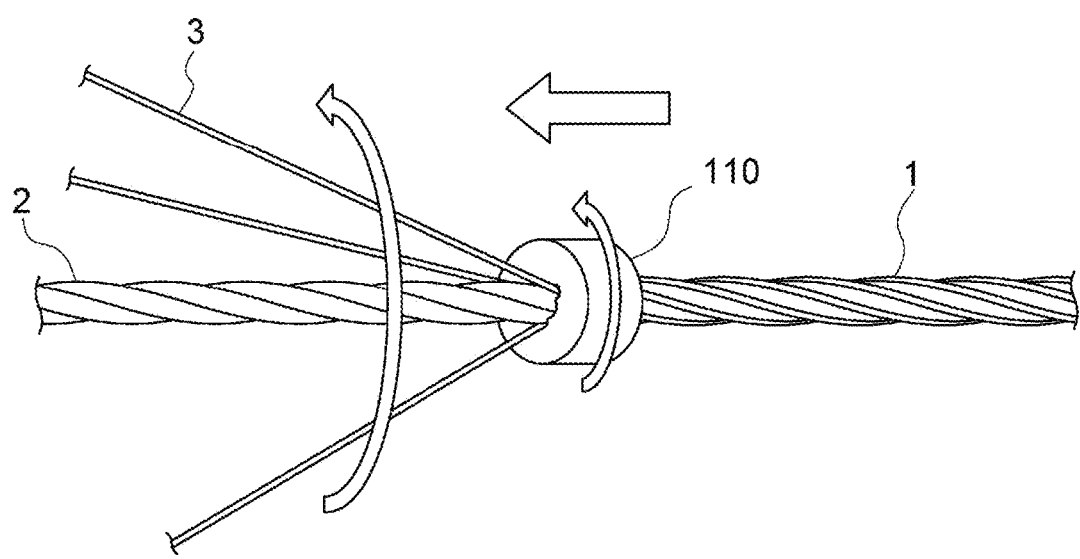
FIG. 5 is a diagram illustrating the manner in which resin wires are wound around a wire rope body using the resin wire winding die illustrated in FIGS. 4A to 4H.

As illustrated in FIG. 5, the resin wire winding die 110 is caused to move relatively along the wire rope body 2 while being rotated; as a result, the wire rope with resin wire 1 can be produced through winding of the resin wires 3 around the wire rope body 2. The wire rope with resin wire 1 can thus be produced efficiently and in a simpler manner, by using the resin wire winding die 110 in order to wind the resin wires 3 around the wire rope body 2.

Where the resin wires 3 are wound manually around the wire rope body 2, without using the resin wire winding die 110, there is a chance of variability in execution depending on the operator, and also a chance of the resin wires 3 floating off the wire rope body 2. Through the use of the resin wire winding die 110, by contrast, it becomes possible to wind the resin wires 3 neatly around the wire rope body 2, without gaps and with stable execution.

Moreover, manual winding of the resin wires 3 is limited to one wire at a time, which entails a longer operation. Through the use of the resin wire winding die 110, however, a plurality of resin wires 3 can be wound collectively around the wire rope body 2, as illustrated in FIG. 5. The working time required to produce the wire rope with resin wire 1 can be shortened as a result.

In manual winding of the resin wires 3, furthermore, the resin wires 3 not yet wound must be processed by hand at the same time; as a result, a situation arises in that hands must inevitably be released from portions already wound during the winding operation. The resin wires 3 at the portion already wound spring back as a result, thereby coming off the wire rope body 2. Some working time may then be required in order to rewind that portion around the wire rope body 2. When using the resin wire winding die 110, on the other hand, the resin wires 3 having been wound are pressed down by the resin wire winding die 110; as a result, the concern of spring back is allayed, and work efficiency is improved.

<Method for Producing a Wire Rope with Resin Wire>

FIGS. 6A to 6E illustrate an ordinary production process of the wire rope body 2.

Figure 6B:
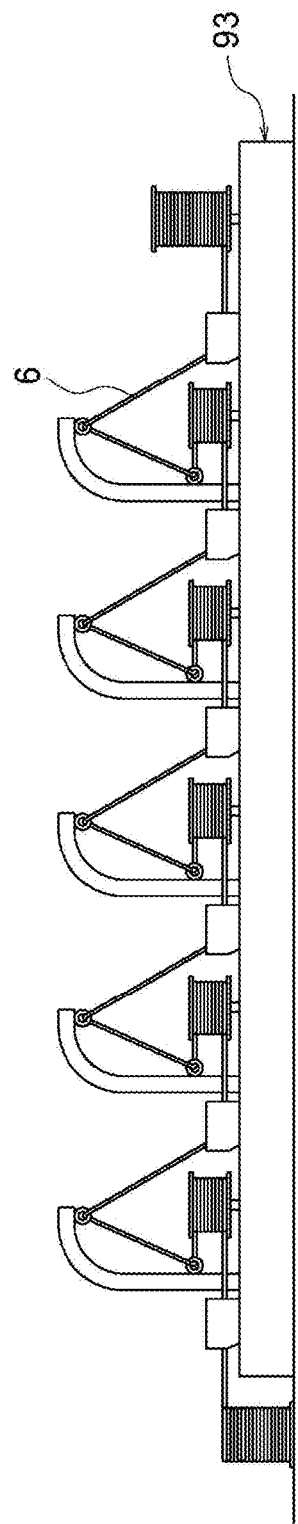
FIG. 6B is a schematic diagram illustrating a wire drawing step, in an ordinary production process of a wire rope body.
Figure 6D:
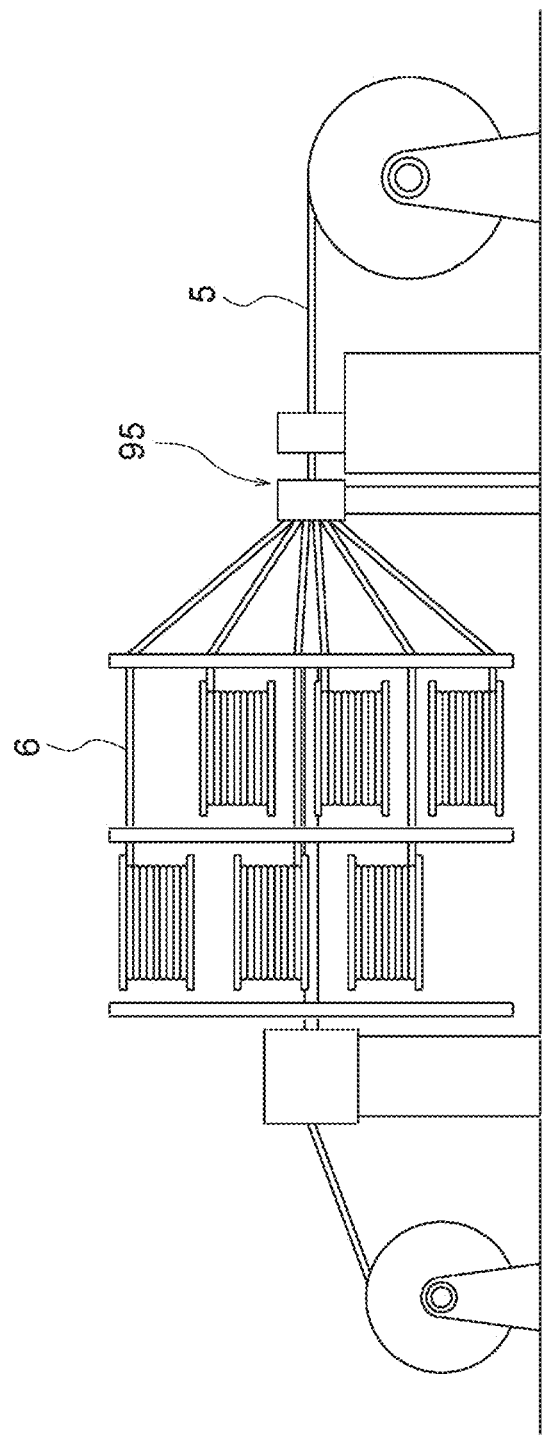
FIG. 6D is a schematic diagram illustrating a strand formation step of through wire twisting, in an ordinary production process of a wire rope body.
Figure 6E:
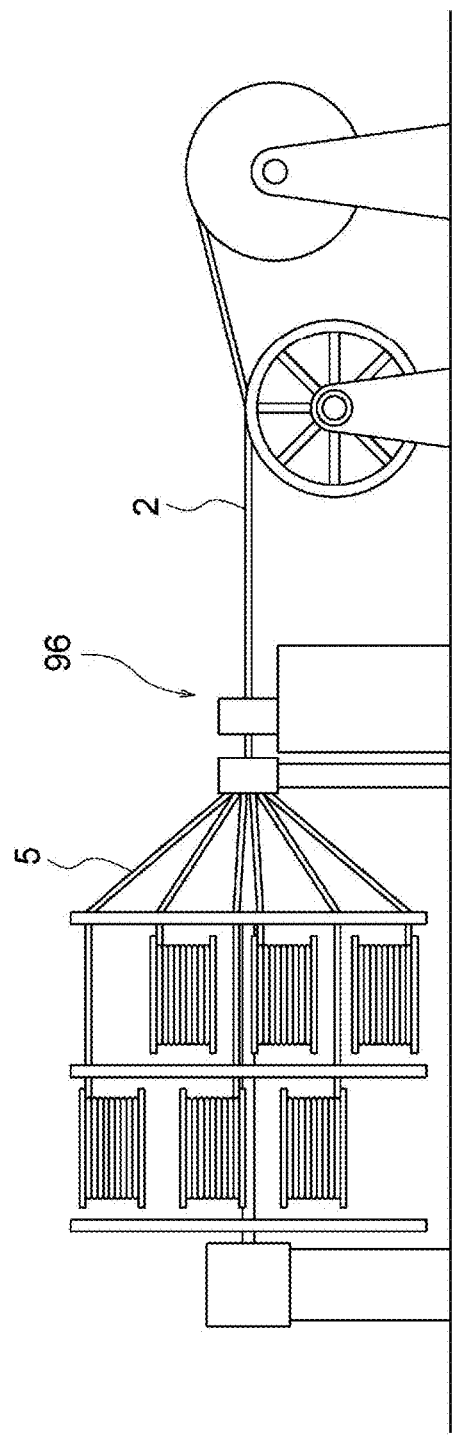
FIG. 6E is a schematic diagram illustrating a rope-making step, in an ordinary production process of a wire rope body.

As illustrated in FIG. 6A, the wires 6 of the wire rope body 2 are first thermally treated in a special thermal treatment furnace 91, after which the wires 6 are washed by passing through hydrochloric acid tanks 92. Thereafter the wires 6 are drawn by a continuous drawing machine 93, as illustrated in FIG. 6B. The wires 6 are subsequently plated by being immersed in plating tanks 94, as illustrated in FIG. 6C. The plurality of wires 6 are then twisted together by a strander 95 to yield a strand 5, as illustrated in FIG. 6D. A plurality of strands 5 are then twisted together and made into a rope using a rope-making machine 96, to form the wire rope body 2, as illustrated in FIG. 6E.

Embodiments 1 to 4 of a method for producing the wire rope with resin wire 1 will be explained next on the basis of FIGS. 7 to 23.

Embodiment 1

Figure 7:
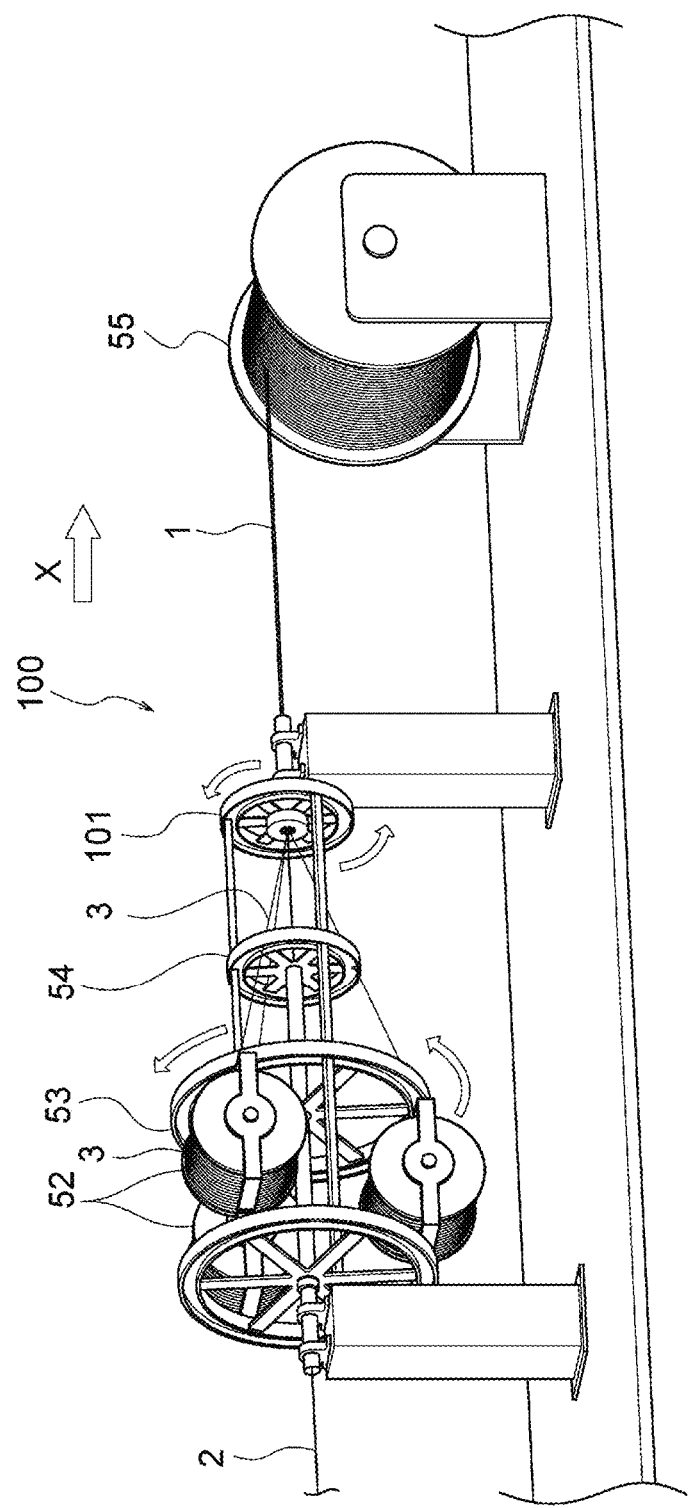
FIG. 7 is a perspective-view diagram illustrating a winding device used in a method for producing a wire rope with resin wire according to Embodiment 1 of the present invention.

As illustrated in FIG. 7, a winding device 100 used for producing the wire rope with resin wire 1 is provided with a resin wire holder 53, a deflection preventing part 54 and a resin wire winding part 101. The wire rope body 2 passes through the centers of the resin wire holder 53, the deflection preventing part 54 and the resin wire winding part 101 of the winding device 100. The resin wire holder 53 has three resin wire rolls 52. The resin wire rolls 52 hold respective resin wires 3. The resin wires 3 paid out by the resin wire rolls 52 pass through the deflection preventing part 54, and are wound around the wire rope body 2 in the resin wire winding part 101. The produced wire rope with resin wire 1 is taken up on a finished product roll 55. The resin wire holder 53, the deflection preventing part 54 and the resin wire winding part 101 are connected to each other integrally, and are provided so as to be capable of rotating about the wire rope body 2.

Figure 8:
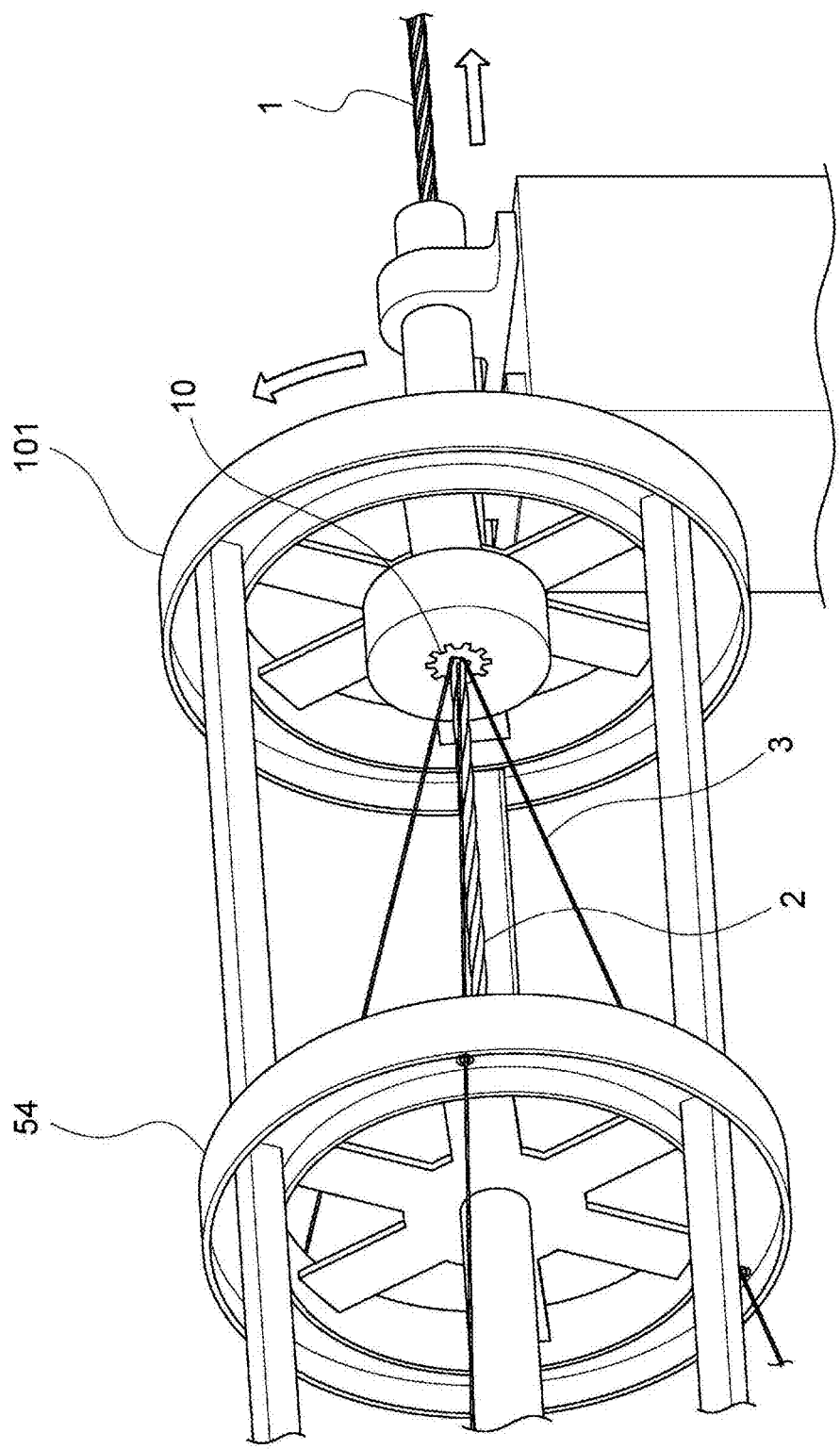
FIG. 8 is a perspective-view diagram illustrating an enlargement of a resin wire winding part of the winding device of FIG. 7.
Figure 9:
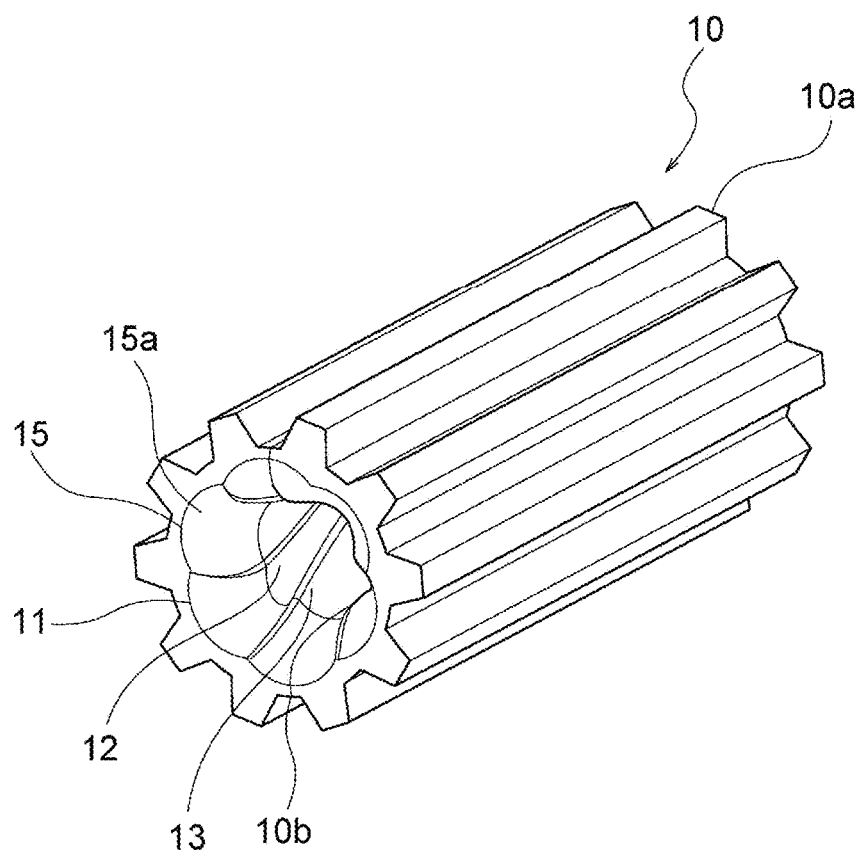
FIG. 9 is a perspective-view diagram illustrating a resin wire winding die used in the winding device depicted in FIG. 7.

As illustrated in FIG. 8, a resin wire winding die 10 for winding the resin wires 3 around the wire rope body 2 is provided in the resin wire winding part 101. As illustrated in FIG. 9, the resin wire winding die 10 is a substantially cylindrical member having a plurality of projections 10a on the outer circumference. The resin wire winding die 10 can be split in the axial direction by a splitting section 10b. The resin wire winding part 101 of the winding device 100 can be easily serviced thanks to the fact that the resin wire winding die 10 can be thus split in the axial direction. A winding hole 11 through which the wire rope body 2 and the resin wires 3 can run is formed in the resin wire winding die 10. On the inner peripheral face of the winding hole 11 there are formed strand grooves 12 corresponding to the respective strands 5a, 5b, 5c and resin wire grooves 13 corresponding to respective resin wires 3, similarly to the case of the resin wire winding die 110 illustrated in FIGS. 4A to 4H. That is, respective strands 5a, 5b, 5c can fit in the strand grooves 12, and the respective resin wires 3 can fit in the resin wire grooves 13. The end of the winding hole 11 on the side into where the wire rope body 2 and the resin wires 3 are inserted prior to winding around the wire rope body 2 constitutes an insertion-side opening end 15. A taper 15a is formed at the insertion-side opening end 15 of the winding hole 11.

Upon winding of the resin wires 3 around the wire rope body 2 using the winding device 100, the finished wire rope with resin wire 1 moves by being pulled in the axial direction X, while being taken up on the finished product roll 55, as illustrated in FIG. 7. Specifically, the wire rope body 2 and the resin wires 3 are also moved prior to winding by being pulled in the axial direction X. In concert with this, the resin wire winding part 101 of the winding device 100 rotates along the twist of the wire rope with resin wire 1, as a result of engagement of the wire rope with resin wire 1 and the strand grooves 12 and the resin wire grooves 13 of the resin wire winding die 10. At the same time, the resin wire holder 53 and the deflection preventing part 54 as well rotate integrally with the resin wire winding part 101. As a result, the three resin wires 3 become as a result spirally wound around the wire rope body 2.

In the winding device 100 according to Embodiment 1, the wire rope body 2 and the resin wires 3 are thus caused to move by being pulled in the axial direction X, in a state where the wire rope body 2 and the resin wires 3 run through the winding hole 11. As a result the resin wires 3 can be wound spirally around the wire rope body 2 while allowing the resin wire winding die 10 to rotate naturally, and a wire rope with resin wire 1 can be produced in a simple manner.

Figure 10:
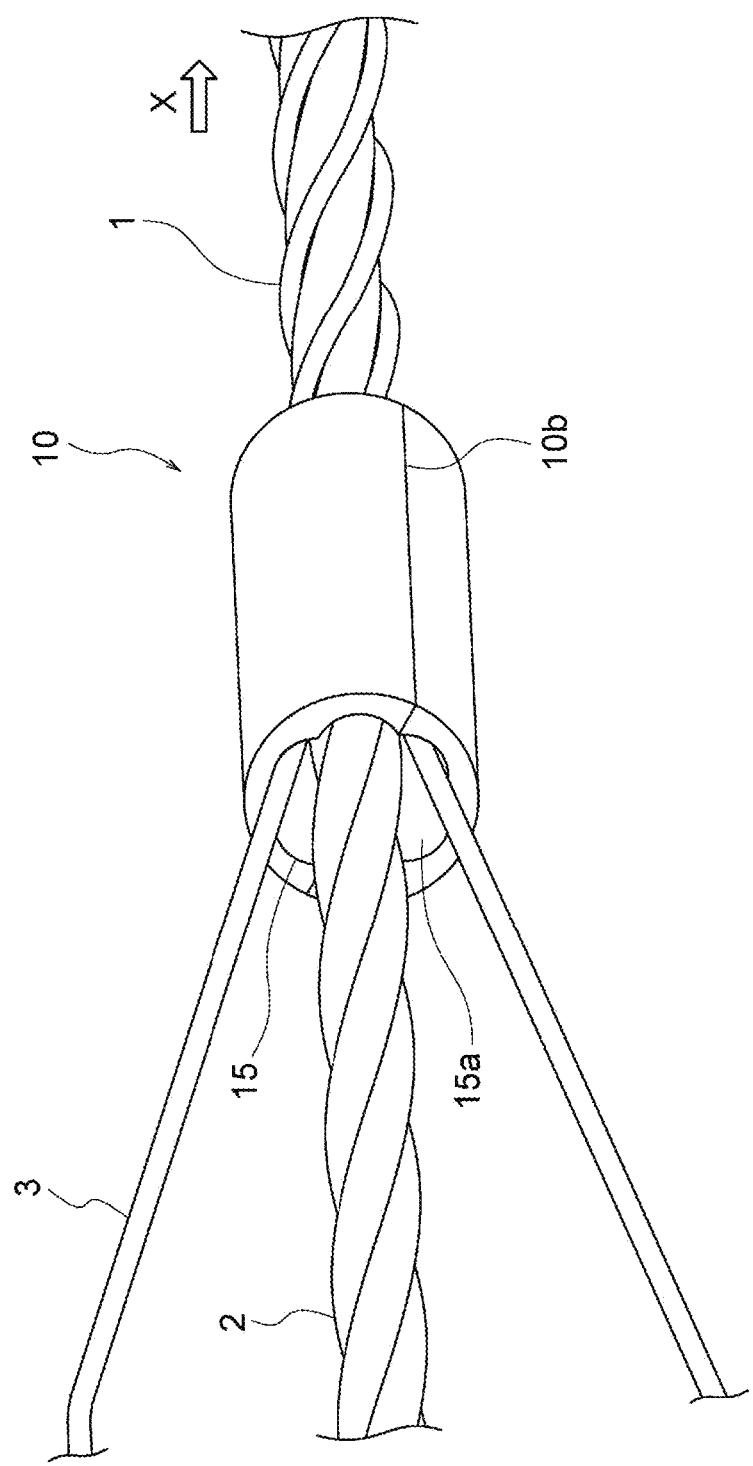
FIG. 10 is a perspective-view diagram illustrating a relationship between resin wires and an insertion-side opening end of a winding hole in the resin wire winding die depicted in FIG. 9.
Figure 11:
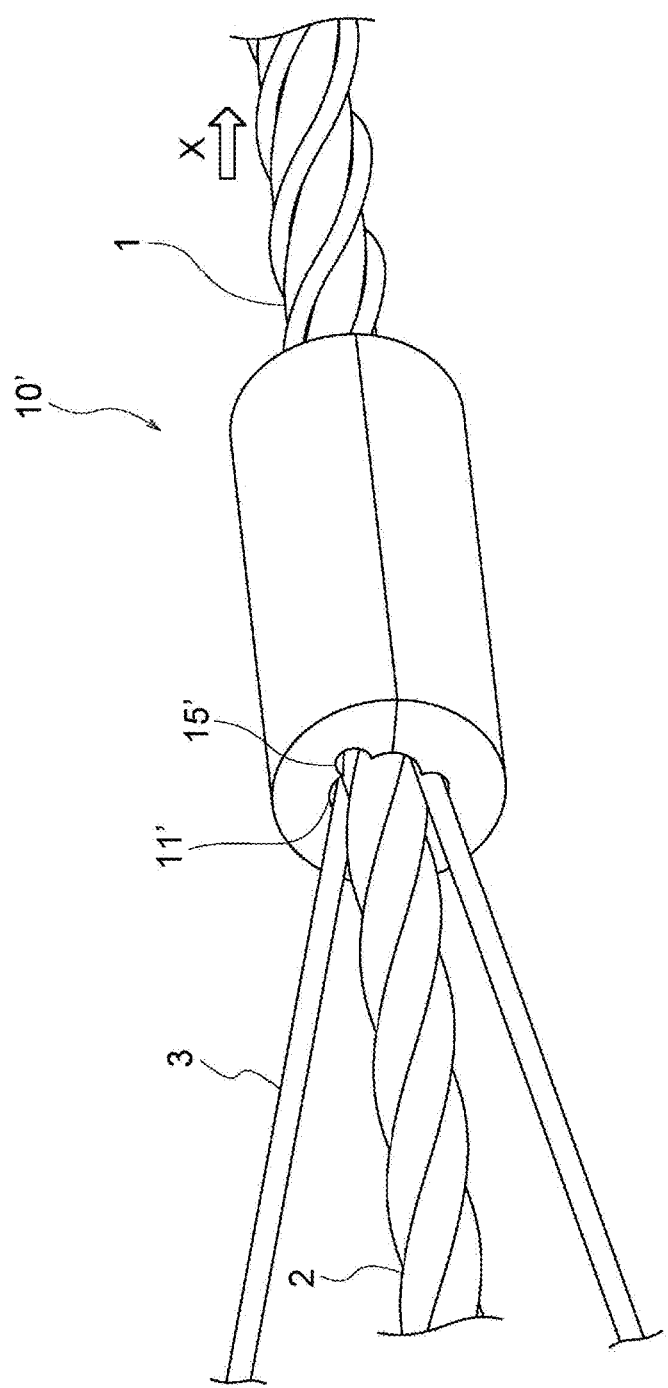
FIG. 11 is a perspective-view diagram illustrating an insertion-side opening end of a winding hole of a resin wire winding die according to another example.

In a hypothetical case as illustrated in FIG. 11 where a taper is not formed in the insertion-side opening end 15' of the winding hole 11' of the resin wire winding die 10', the resin wires 3 are pulled in the axial direction X while being sandwiched between the insertion-side opening end 15' and the wire rope body 2. As a consequence, if the resin wires 3 are formed through coating of iron wires with a resin, the coating of the resin wires 3 might get caught as a result in the insertion-side opening end 15', and be stripped off. By contrast, through formation of the taper 15a in the insertion-side opening end 15 of the winding hole 11 of the resin wire winding die 10, as illustrated in FIGS. 9 and 10, the resin wires 3 are guided so as to be gradually wound around the wire rope body 2, and stripping of the coating is prevented.

The projections 10a on the outer circumference of the resin wire winding die 10 have been omitted in FIG. 10.

Embodiment 2

A handle-type winding device 200 for producing a wire rope with resin wire 1 through mounting of the resin wires 3 to an existing wire rope body 2 will be explained next with reference to FIGS. 12 to 15.

Figure 12:
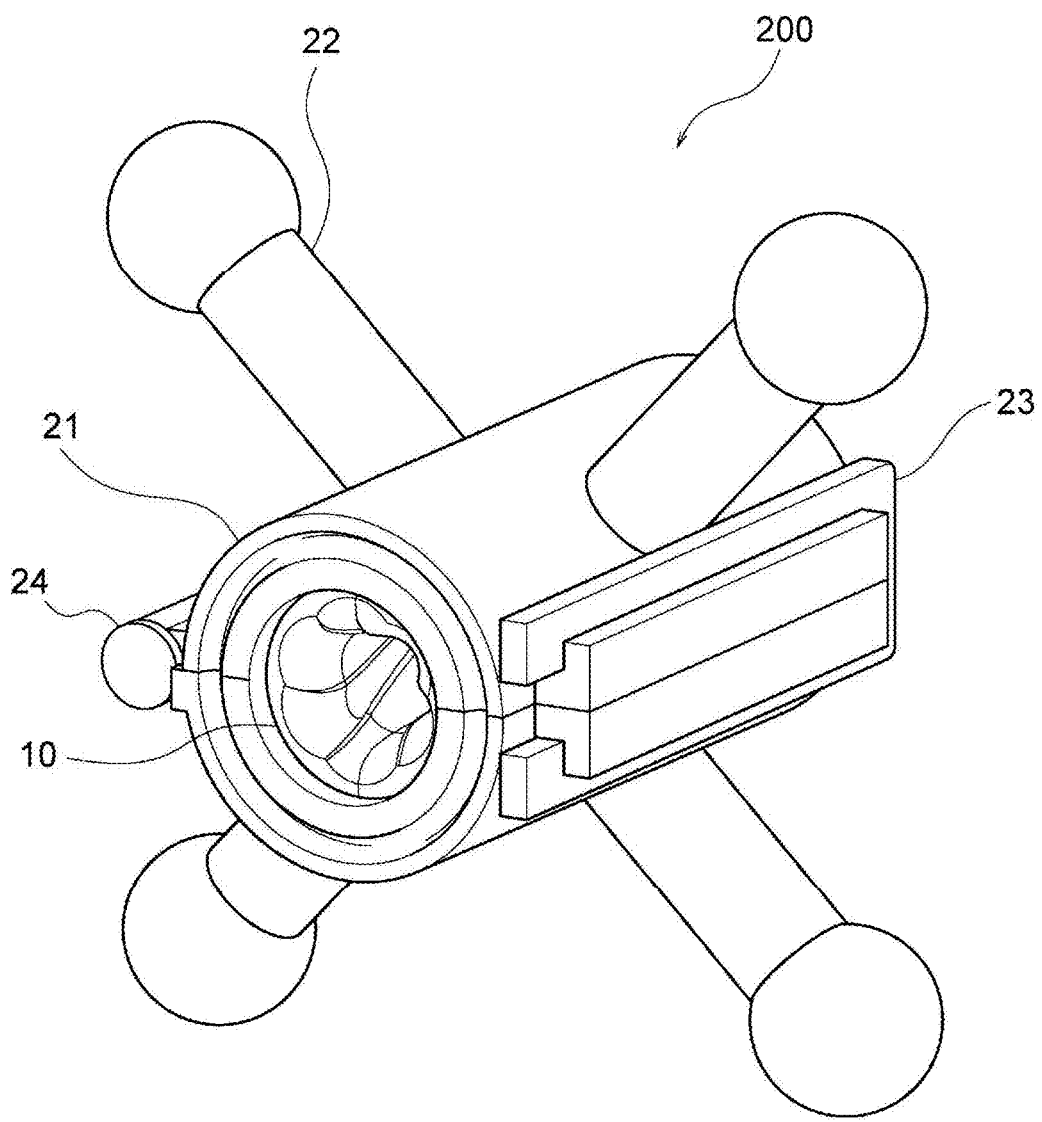
FIG. 12 is a perspective-view diagram illustrating a handle-type winding device used in a method for producing a wire rope with resin wire according to Embodiment 2 of the present invention.
Figure 13:
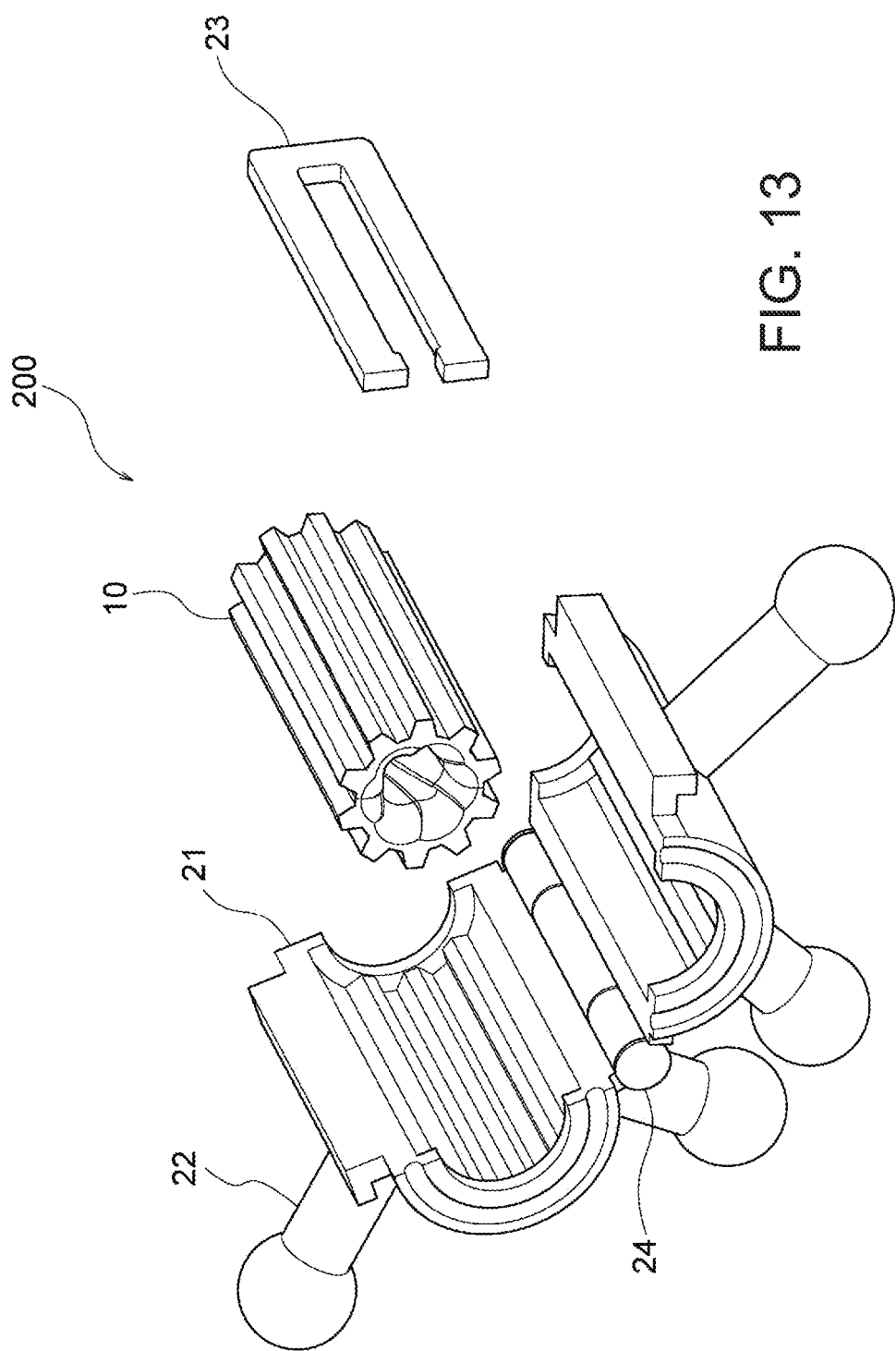
FIG. 13 is an exploded perspective-view diagram of the handle-type winding device depicted in FIG. 12.

As illustrated in FIGS. 12 and 13, a handle-type winding device 200 has a substantially cylindrical outer enclosure 21 that accommodates the resin wire winding die 10, in the interior thereof, and four grips 22 provided protruding outward of the outer enclosure 21 in the radial direction. The outer enclosure 21 has a shape that is split in two, and can be opened and closed by way of a hinge 24. The outer enclosure 21 is locked, as illustrated in FIG. 12, by a pressing clamp 23 being a substantially U-shaped plate-like member.

Figure 14:
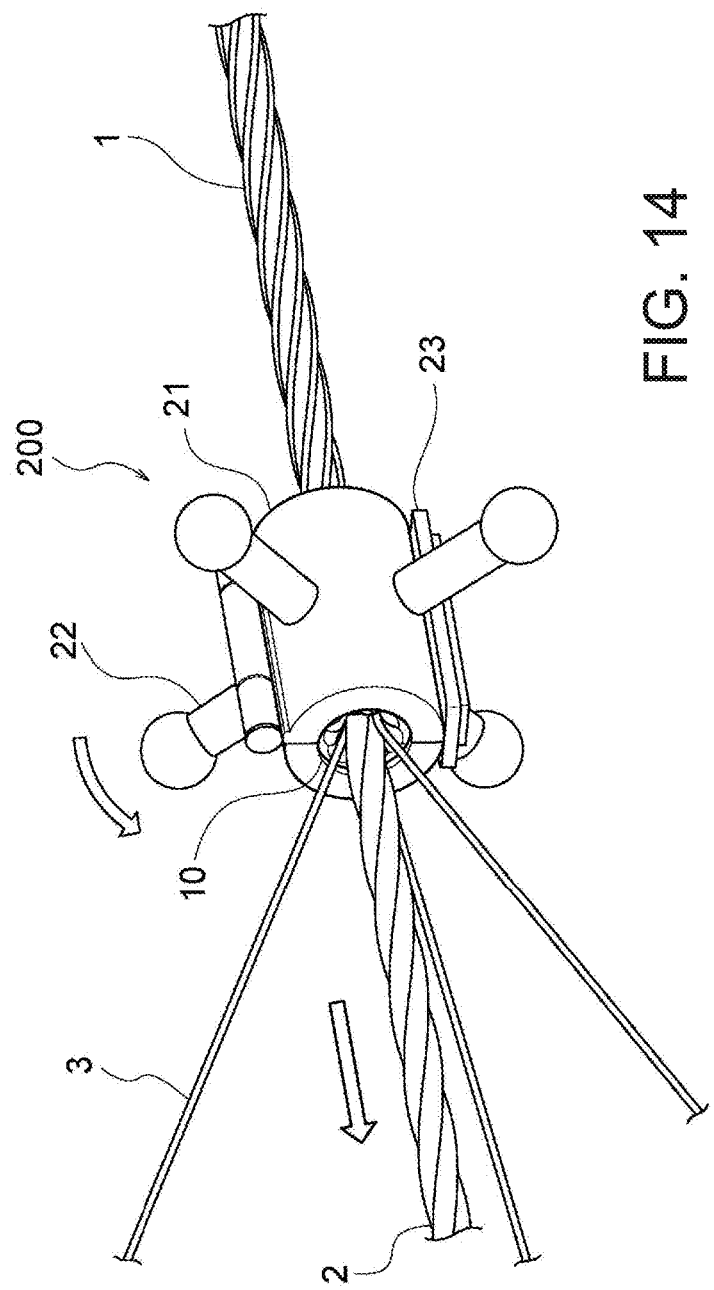
FIG. 14 is a perspective-view diagram illustrating winding of resin wires around a wire rope body using the handle-type winding device depicted in FIG. 12.

As illustrated in FIG. 14, an operator holds the grips 22 and, with the wire rope body 2 and the resin wires 3 running through the resin wire winding die 10, moves the handle-type winding device 200 along the wire rope body 2 while rotating the handle-type winding device 200. As a result three resin wires 3 can be wound spirally around the wire rope body 2.

Figure 15:
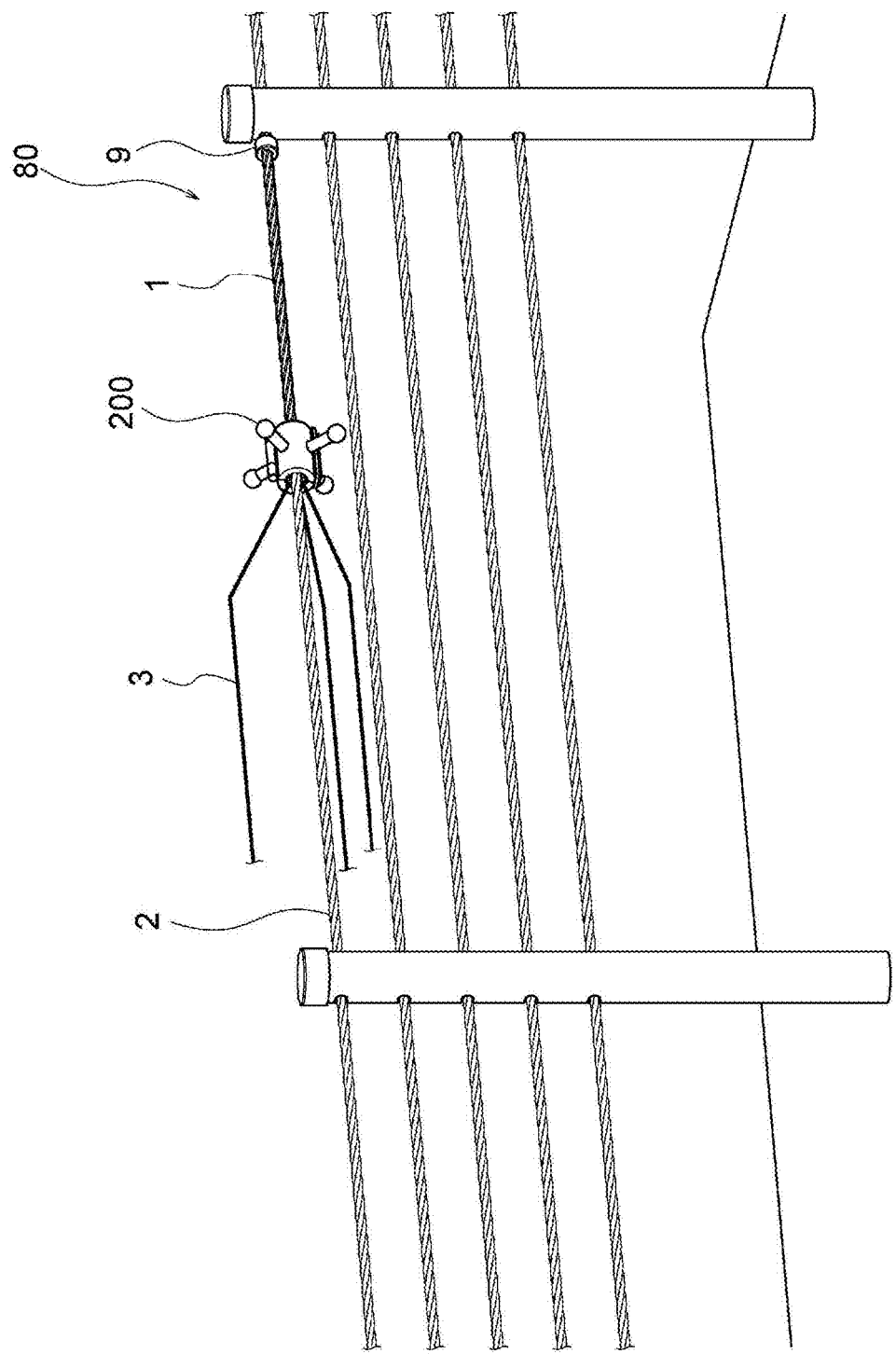
FIG. 15 is a perspective-view diagram illustrating mounting of resin wires around a wire rope body of an existing guard cable, using the handle-type winding device depicted in FIG. 12.

As described above, in the handle-type winding device 200 according to Embodiment 2, the resin wire winding die 10 is caused to move along the wire rope body 2 while being rotated, in a state where the wire rope body 2 and the resin wires 3 run through the winding hole 11. As a result the resin wires 3 can be wound spirally around the wire rope body 2, and a wire rope with resin wire 1 can be produced in a simple manner. Through the use of the handle-type winding device 200 it becomes possible to produce the wire rope with resin wire 1 by also mounting the resin wires 3 on the wire rope body 2 of an existing guard cable 80, as illustrated in FIG. 15.

Figure 16:
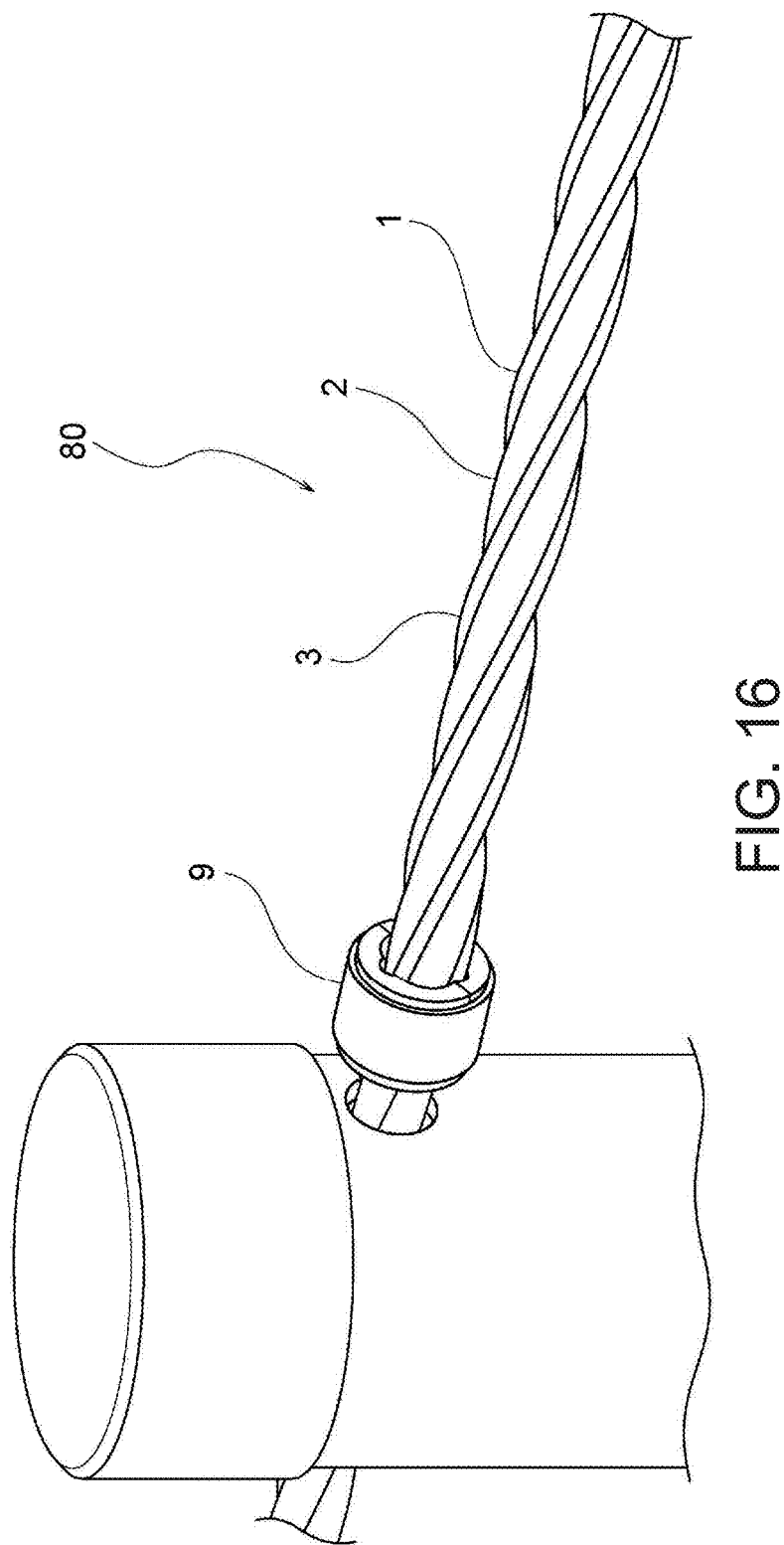
FIG. 16 is a perspective-view diagram illustrating end-portion processing of a wire rope with resin wire in a guard cable around which resin wires are wound using the handle-type winding device depicted in FIG. 12.

The ends of the resin wires 3 wound around the wire rope body 2 of the guard cable 80 are fixed to the wire rope body 2 by a fixing member 9 illustrated in FIG. 16.

Embodiment 3

A cylinder-type winding device 300 for producing a wire rope with resin wire 1 through mounting of the resin wires 3 on an existing wire rope body 2 will be explained next with reference to FIGS. 17 to 19.

Figure 17:
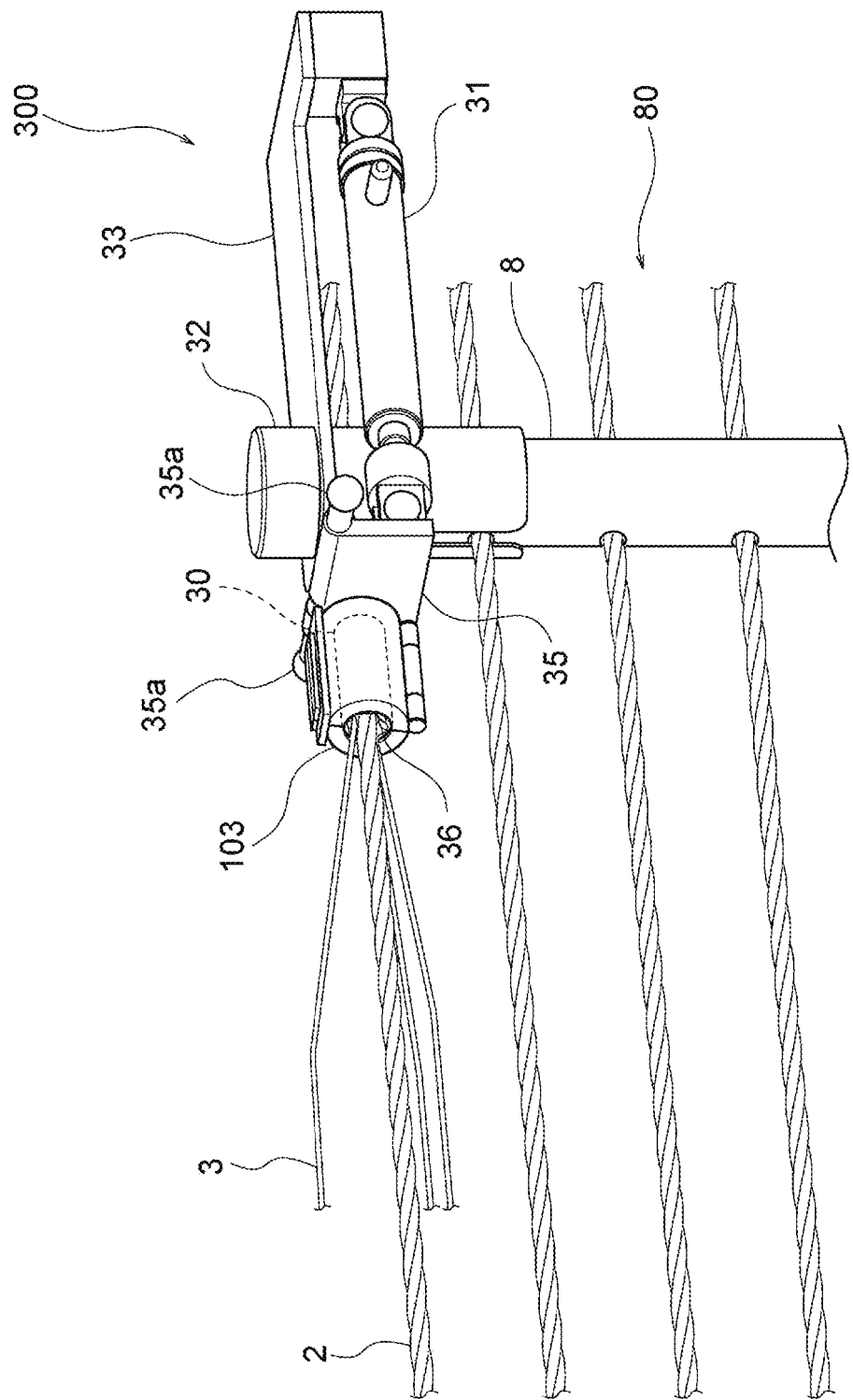
FIG. 17 is a perspective-view diagram illustrating a cylinder-type winding device used in a method for producing a wire rope with resin wire according to Embodiment 3 of the present invention.

As illustrated in FIG. 17, the cylinder-type winding device 300 has a resin wire winding part 103 with a resin wire winding die 30 in the interior thereof, and a cylinder part 31 being a hydraulic cylinder for pressing and moving the resin wire winding part 103. A plate-like extrusion part 35 is provided between the resin wire winding part 103 and the cylinder part 31. The extrusion part 35 has a pair of handles 35a that overhang in a direction perpendicular to the extension direction of the wire rope body 2.

The substantially cylindrical resin wire winding die 30 is provided rotatably in the interior of the resin wire winding part 103. A winding hole 36 of the resin wire winding die 30 has a structure similar to that of the winding hole 11 of the resin wire winding die 10 illustrated in FIG. 9. The wire rope body 2 and three resin wires 3 are inserted in the winding hole 36 of the resin wire winding die 30.

The cylinder-type winding device 300 has a substantially cylindrical pole-mounting part 32. The cylinder-type winding device 300 is removably mounted on a pole 8 of an existing guard cable 80 via the pole-mounting part 32. An end of a substantially plate-shaped support 33 extending parallel to the cylinder part 31 is connected to the pole-mounting part 32. Further, one end of the cylinder part 31 is removably fixed to the other end of the support 33.

Figure 18:
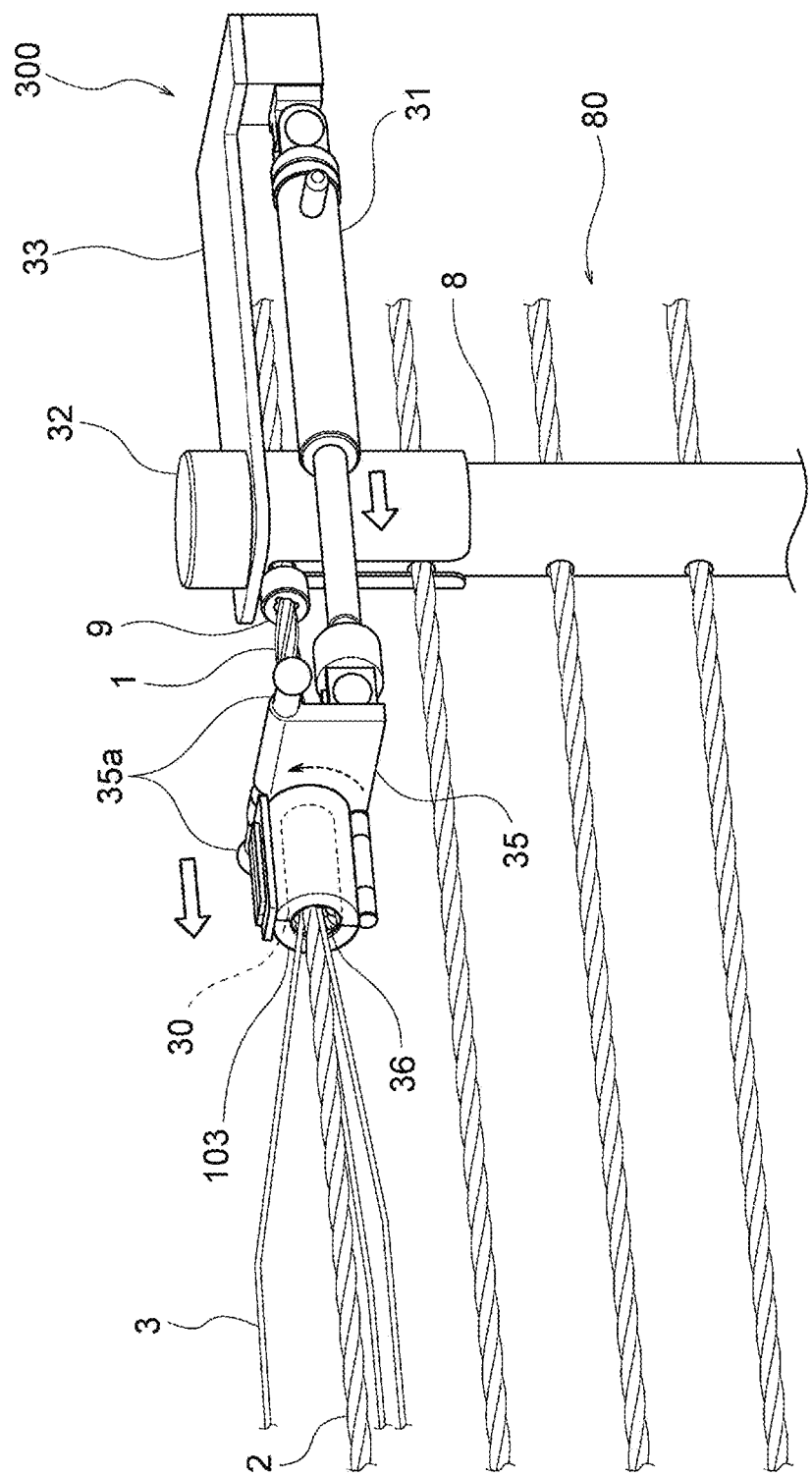
FIG. 18 is an exploded perspective-view diagram illustrating the operation of the cylinder-type winding device depicted in FIG. 17.

As illustrated in FIG. 18, the cylinder part 31 is extended due to hydraulic pressure, and the extrusion part 35 and the resin wire winding part 103 are pressed by the cylinder part 31, and move along the wire rope body 2. The resin wire winding die 30 of the resin wire winding part 103 then rotates along the twist of the wire rope body 2. As a result, the resin wires 3 become wound around the wire rope body 2. During movement of the resin wire winding part 103, the operator supports the extrusion part 35 by gripping the handles 35a in such a manner that the position of the extrusion part 35 is not offset. As a result, the pressing pressure of the cylinder part 31 is evenly transmitted to the resin wire winding part 103, and the resin wires 3 can be wound around the wire rope body 2 more reliably.

Figure 19:
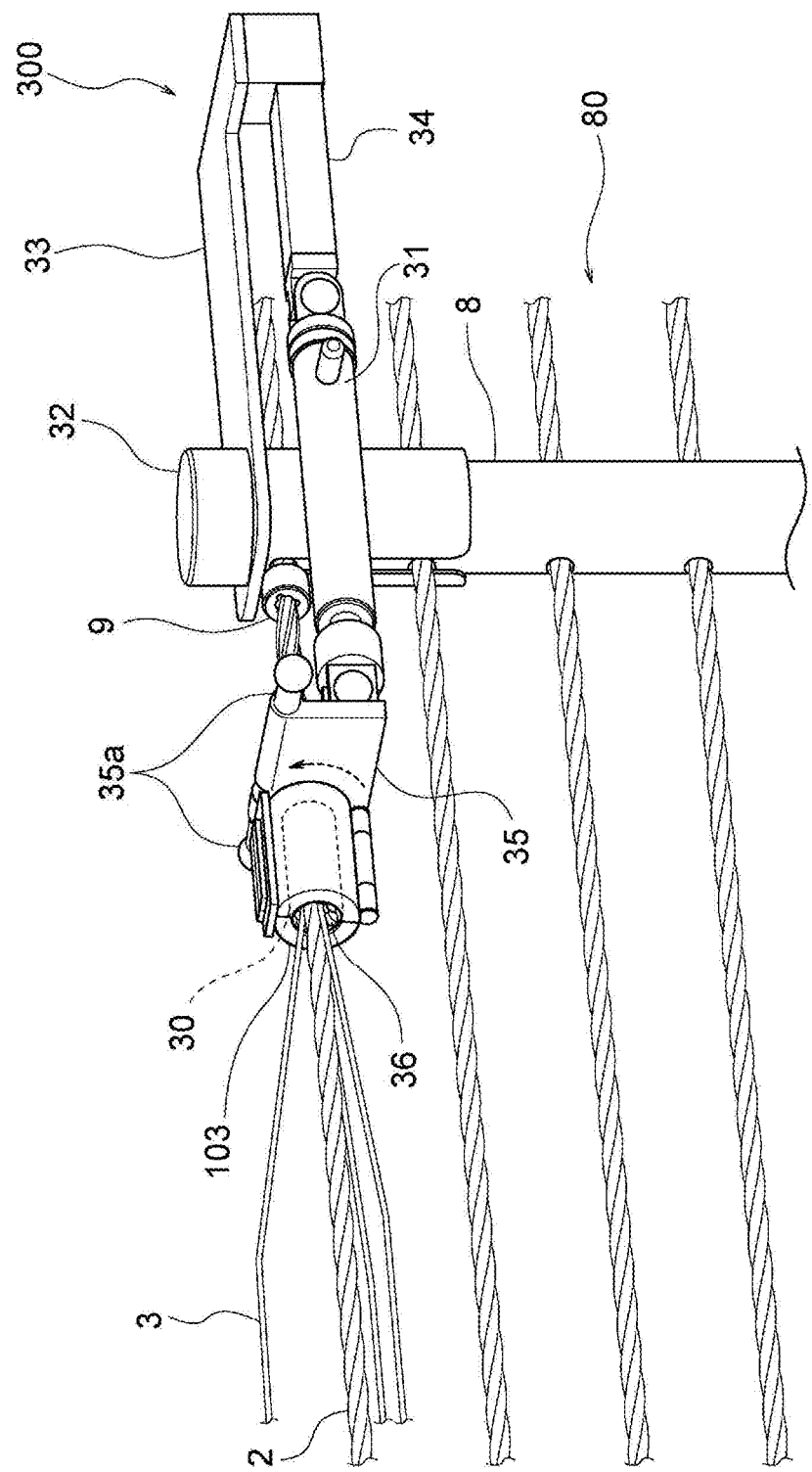
FIG. 19 is a perspective-view diagram illustrating the attachment of an extension rod to the cylinder-type winding device depicted in FIG. 17.

An extension rod 34 is mounted between the cylinder part 31 and the support 33, as illustrated in FIG. 19, when, after complete extension of the cylinder part 31, the resin wires 3 are to be wound around the entirety of the wire rope body 2 through further displacement of the resin wire winding part 103. The resin wire winding part 103 is further pressed by the cylinder part 31, with the extension rod mounted thereto. As a result it becomes possible to further lengthen the interval over which the resin wires 3 can be wound around the wire rope body 2 by the cylinder-type winding device 300.

The extension rod 34 is added as appropriate every time that the resin wire winding part 103 is pushed out, in accordance with the length of the wire rope body 2.

As described above, in the cylinder-type winding device 300 according to Embodiment 3 the resin wire winding die 30 is caused to move along the wire rope body 2 while being allowed to rotate, in a state where the wire rope body 2 and the resin wires 3 run through the winding hole 36 of the resin wire winding die 30. As a result the resin wires 3 can be wound spirally around the existing wire rope body 2 while allowing the resin wire winding die 10 to rotate naturally. That is, the wire rope with resin wire 1 can be arranged easily, without removal of the wire rope body 2, even for an existing guard cable 80.

The cylinder part 31 in the above embodiment is a hydraulic cylinder, but the cylinder part is not limited thereto, and may be an electrically-powered cylinder.

Embodiment 4

A winch-type winding device 400 for producing a wire rope with resin wire 1 through mounting of the resin wires 3 to an existing wire rope body 2 will be explained next with reference to FIGS. 20 to 23.

Figure 20:
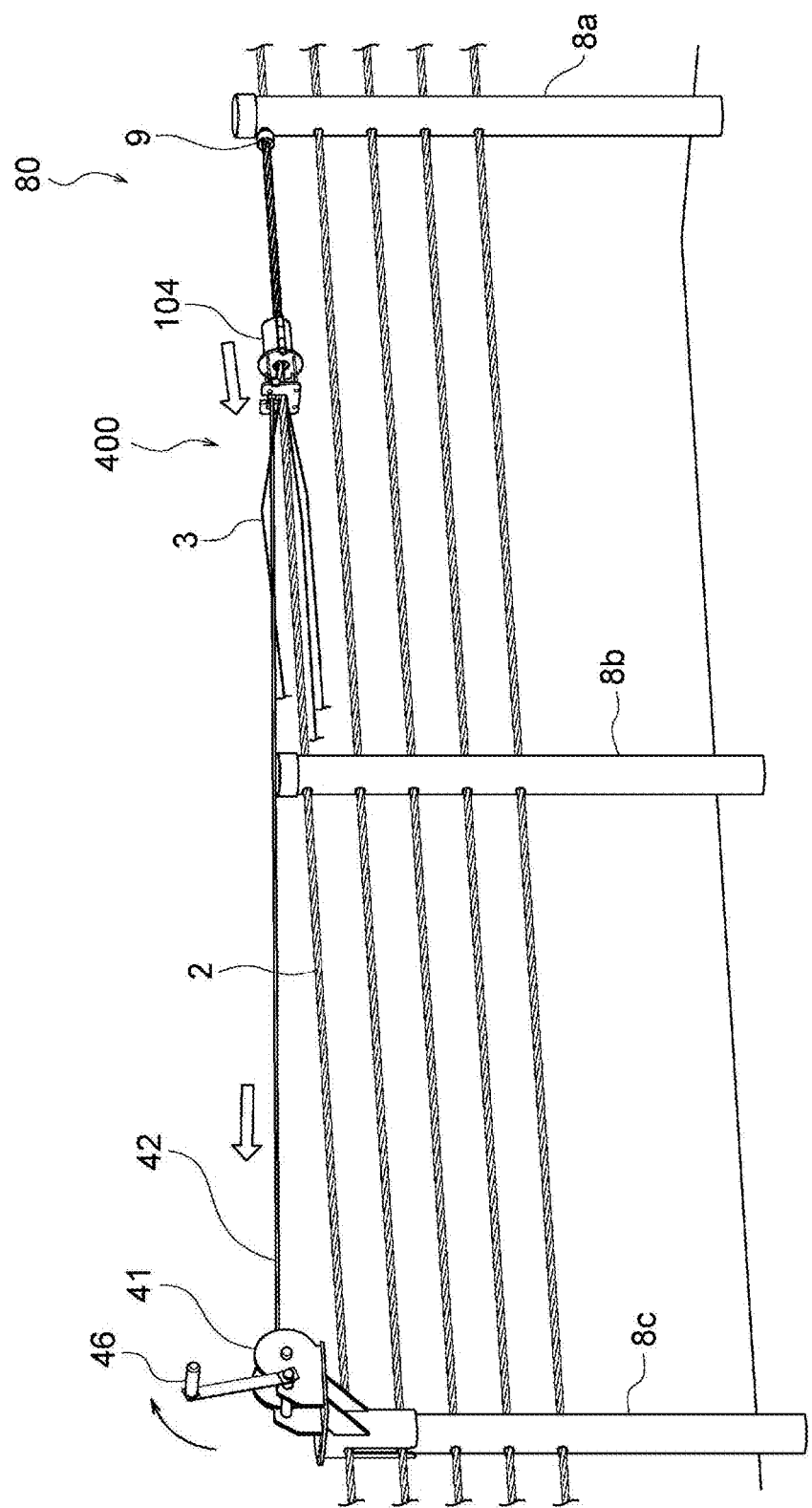
FIG. 20 is a perspective-view diagram illustrating a winch-type winding device used in a method for producing a wire rope with resin wire according to Embodiment 4 of the present invention.

As illustrated in FIG. 20, the winch-type winding device 400 has a resin wire winding part 104 and a winch 41 for moving the resin wire winding part 104 along the wire rope body 2. To wind the resin wires 3 around the wire rope body 2 by the resin wire winding part 104, between adjacent poles 8a, 8b of an existing guard cable 80, the winch 41 is mounted on a pole 8c adjacent to the pole 8b. The pole 8c is positioned on the side opposite the pole 8a, across the pole 8b.

An end of a winch wire 42 is mounted on the resin wire winding part 104. The winch wire 42 is taken up by the winch 41, as a result of which the resin wire winding part 104 moves along the wire rope body 2. A manual handle 46 is provided in the winch 41. The winch 41 is rotated, through turning of the handle 46, to allow taking up the winch wire 42.

Figure 21:
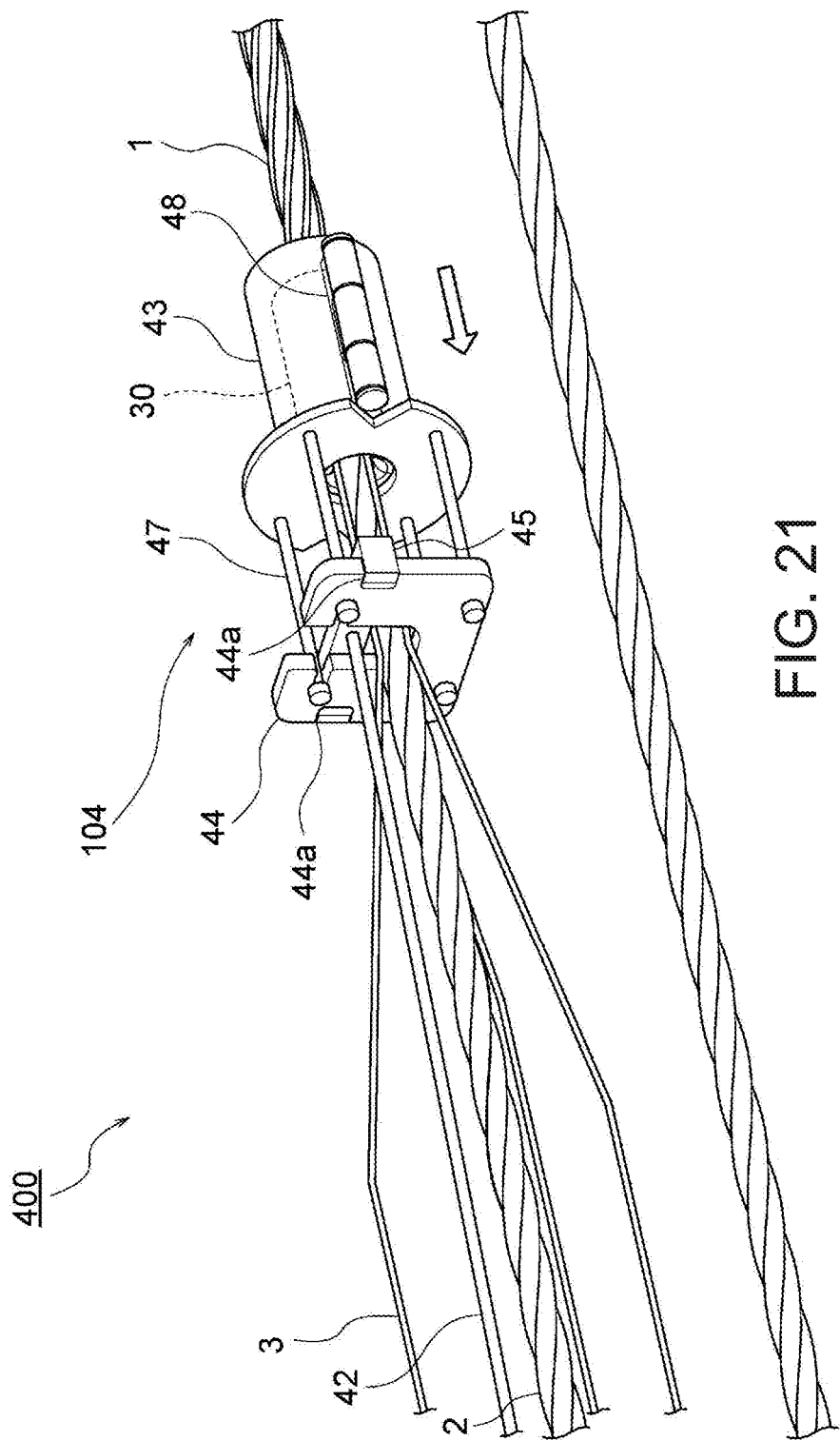
FIG. 21 is a perspective-view diagram illustrating a resin wire winding part in the winch-type winding device depicted in FIG. 20.

As illustrated in FIG. 21, the winch-type winding device 400 has a substantially cylindrical outer enclosure 43 that accommodates a resin wire winding die 30 in the interior, and a substantially square tension plate 44 that is connected to the outer enclosure 43 via four intermediate wires 47. A pair of cutouts 44a is formed in the tension plate 44, with a tension fitting 45 engaged with the pair of cutouts 44a. The end of the winch wire 42 is fixed to the tension fitting 45.

Figure 22:
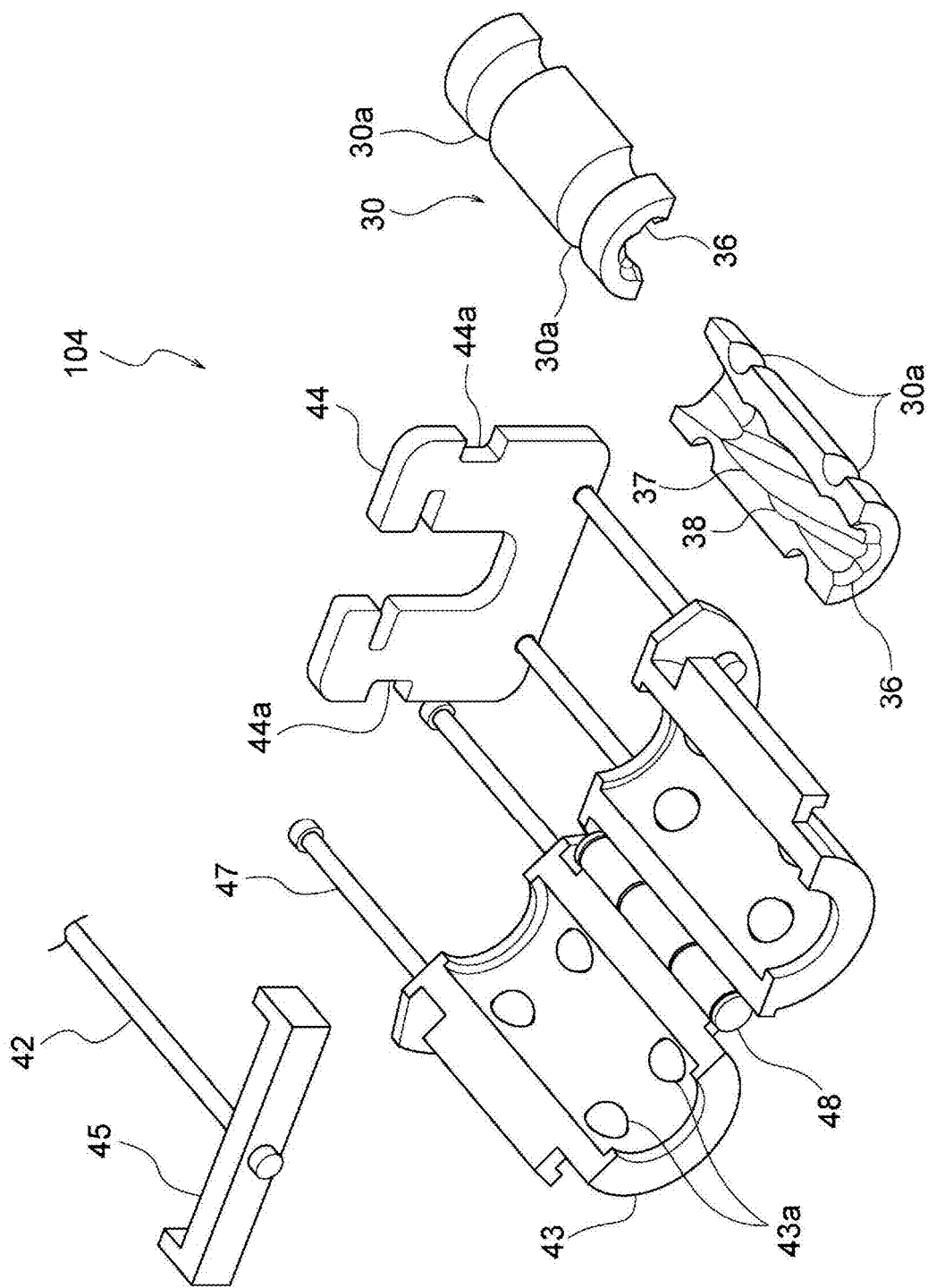
FIG. 22 is an exploded diagram of a resin wire winding part of the winch-type winding device depicted in FIG. 21.

As illustrated in FIG. 22, the outer enclosure 43 has a shape split in two, and can be opened and closed by way of a hinge 48. The resin wire winding die 30 as well can be split in two in the axial direction. The resin wire winding die 30 can be easily mounted on the existing wire rope body 2 by virtue of the fact that the resin wire winding die 30 can be split in two in the axial direction.

Strand grooves 37 into which the respective strands 5a, 5b, 5c can fit and resin wire grooves 38 into which the respective resin wires 3 can be fit are formed, similarly to the case of the resin wire winding die 10, on the inner peripheral face of the winding hole 36 of the resin wire winding die 30.

The grooves 30a are formed in the outer circumference in the vicinity of both ends of the resin wire winding die 30. Semi-spherical projections 43a are provided on the inner peripheral face of the outer enclosure 43, at respective positions corresponding to the grooves 30a of the resin wire winding die 30. The resin wire winding die 30 is provided rotatably in the interior of the outer enclosure 43 through mutual engagement of the grooves 30a of the resin wire winding die 30 and the projections 43a of the outer enclosure 43. The grooves 30a of the resin wire winding die 30 and the projections 43a of the outer enclosure 43 are in point contact with each other, and accordingly there is reduced the friction upon rotation of the resin wire winding die 30.

As illustrated in FIGS. 20 and 21, the winch wire 42 is taken up through turning of the handle 46 of the winch 41 by an operator, and thus the tension plate 44 of the resin wire winding part 104 pulled. As a result, the outer enclosure 43 and the resin wire winding die 30 accommodated in the outer enclosure 43 also move along the wire rope body 2 by being pulled by the intermediate wires 47. The resin wire winding die 30 of the resin wire winding part 104 then rotates along the twist of the wire rope body 2. As a result, the resin wires 3 become wound around the wire rope body 2.

Figure 23:
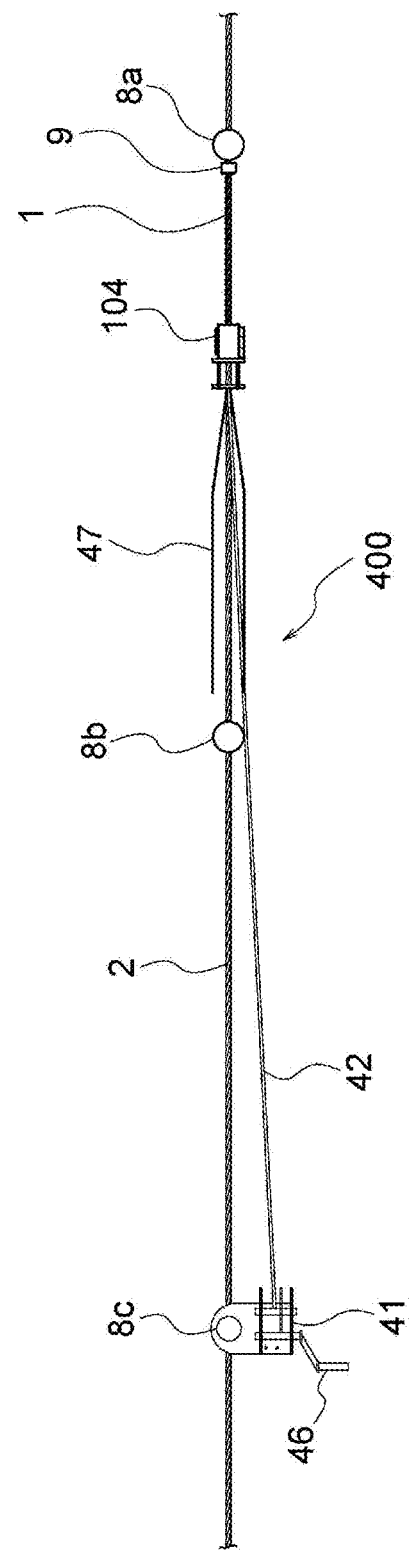
FIG. 23 is a schematic diagram illustrating the positional relationship between the winch of the winch-type winding device depicted in FIG. 20 and a resin wire winding part.

As shown in FIG. 23, the winch 41 is disposed at a position not overlapping the wire rope body 2, as viewed from above, so that the winch wire 42 does not interfere with the pole 8b that is positioned between the winch 41 and the resin wire winding part 104. Through mounting of the winch 41 on the pole 8c at a distance from the interval between the poles 8a, 8b, it becomes possible to wind the resin wires 3 around the entirety of the wire rope body 2 to also include the vicinity of both ends of the interval of the poles 8a, 8b.

As described above, in the winch-type winding device 400 according to Embodiment 4 the resin wire winding part 104 is caused to move along the wire rope body 2 while being allowed to rotate, in a state where the wire rope body 2 and the resin wires 3 run through the winding hole 36 of the resin wire winding die 30. As a result the resin wires 3 can be wound spirally around an existing wire rope body 2 while allowing the resin wire winding die 10 to rotate naturally, similar to the case of the cylinder-type winding device 300.

In the above embodiment the winch 41 is of manual type, but is not limited thereto, and may be for instance a motorized winch.

REFERENCE SIGNS LIST

1, 301 Wire rope with resin wire
2, 302 Wire rope body
2a Recess
3, 303 Resin wire
5a, 5b, 5c Strand
10, 30, 110 Resin wire winding die
11, 36, 111 Winding hole
12, 37, 112 Strand groove
13, 38, 113 Resin wire groove
15 Insertion-side opening end

The invention claimed is:

1. A wire rope with resin wire, comprising:
a wire rope body in which a plurality of strands are twisted together; and
at least one resin wire spirally wound around the wire rope body along a recess between the strands;
wherein the resin wire has a core material made up of a copper wire or nichrome wire and a resin wire main body which covers the core material with a resin, and
wherein the core material generates heat by being energized and the heat is diffused to the outside of the resin wire main body without melting the resin wire main body.

2. A method for producing a wire rope with resin wire by winding the resin wire spirally around a wire rope body using a resin wire winding die in which a plurality of strands are twisted together, the resin wire being wound along a recess between the strands, wherein a winding hole through which the wire rope body and the resin wire can run is formed, and strand grooves into which respective strands can fit and a resin wire groove into which the resin wire can fit are formed spirally along the twist of the wire rope with resin wire, on an inner peripheral face of the winding hole, the method comprising:
causing the wire rope body and the resin wire to move by pulling the wire rope body and the resin wire in an axial direction in a state where the wire rope body and the resin wire run through the winding hole, to thereby spirally wind the resin wire around the wire rope body while the resin wire winding die is rotated.

3. A method for producing a wire rope with resin wire by winding the resin wire spirally around a wire rope body using a resin wire winding die in which a plurality of strands are twisted together, the resin wire being wound along a recess between the strands, wherein a winding hole through which the wire rope body and the resin wire can run is formed and strand grooves into which the respective strands can fit and a resin wire groove into which the resin wire can fit are formed spirally along the twist of the wire rope with resin wire, on an inner peripheral face of the winding hole, the method comprising:
causing the resin wire winding die to move along the wire rope body while rotating in a state where the wire rope body and the resin wire run through the winding hole, to thereby spirally wind the resin wire around the wire rope body.

4. The wire rope with resin wire of claim 1, wherein the resin wire main body entirely covers the core material.

* * * * *